US006827270B2

(12) United States Patent
Yomogida et al.

(10) Patent No.: US 6,827,270 B2
(45) Date of Patent: Dec. 7, 2004

(54) BAR CODE READER HAVING A ROTATORY OPTICAL DEFLECTOR AND A ROTATION POSITION DETECTOR

(75) Inventors: Matsuo Yomogida, Miyagi (JP); Hideaki Matsuda, Miyagi (JP)

(73) Assignee: Tohoku Ricoh Co., LTD, Miyagi (JP)

( * ) Notice: Subject to any disclaimer, the term of this patent is extended or adjusted under 35 U.S.C. 154(b) by 359 days.

(21) Appl. No.: 09/867,710

(22) Filed: May 31, 2001

(65) Prior Publication Data

US 2002/0014532 A1 Feb. 7, 2002

(30) Foreign Application Priority Data

| Jun. 2, 2000 | (JP) | ..................................... 2000-166871 |
| Jun. 5, 2000 | (JP) | ..................................... 2000-167395 |
| Jun. 5, 2000 | (JP) | ..................................... 2000-168322 |
| Aug. 16, 2000 | (JP) | ..................................... 2000-247128 |

(51) Int. Cl.[7] .......................... G06K 7/10; G02B 26/08
(52) U.S. Cl. .................................. 235/462.32; 359/212
(58) Field of Search .................... 235/462.32–462.4; 359/196–226

(56) References Cited

U.S. PATENT DOCUMENTS 4,958,894 A * 9/1990 Khowles ................... 359/213

6,454,169 B1 * 9/2002 Belknap et al. .......... 235/462.4

FOREIGN PATENT DOCUMENTS

| JP | 5-233862 | 9/1993 |
| JP | 6-187481 | 7/1994 |
| JP | 2000-90189 | 3/2000 |

* cited by examiner

*Primary Examiner*—Karl D. Frech
*Assistant Examiner*—Jamara A. Franklin
(74) *Attorney, Agent, or Firm*—Westerman, Hattori, Daniels & Adrian, LLP

(57) ABSTRACT

A bar code reader provided with a laser diode (2) and a rotatory mirror (8) for deflecting a laser beam emitted by the laser diode for scanning, wherein a strip (20A) attached to the rotatory mirror (8), serving as a sensing indicator, is sensed at a position corresponding to a reading start edge of a laser beam scanning range of a bar code (1), and rotation of the rotatory mirror (8) is stopped for a predetermined time length after sensing of the strip (20A) and measurement of a scanning time length up to the final position of bar code reading, respectively, in the case of automatic scanning while rotation of the rotatory mirror (8) is locked upon measurement of half of a scanning time length up to the final position of the bar code reading after the sensing of the strip (20A) in the case of manual scanning, so that the laser beam can be recognized with ease, enabling focusing thereof or the manual scanning to be implemented.

46 Claims, 35 Drawing Sheets

FIG. 25

| 1. MENU    2. T3 - T2=400μSEC |

FIG. 26

| 1. MENU    2. T3 - T2=1mSEC |

FIG. 27

| 1. MENU    2. T3 - T2=525μSEC |

FIG. 29
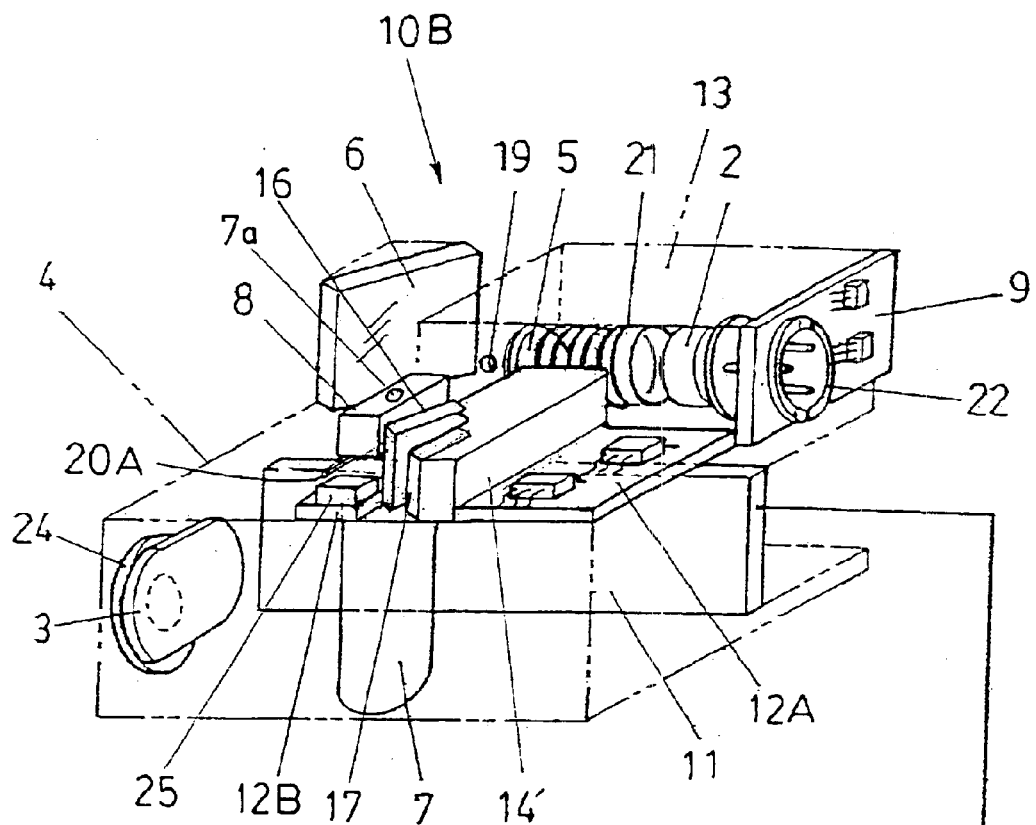
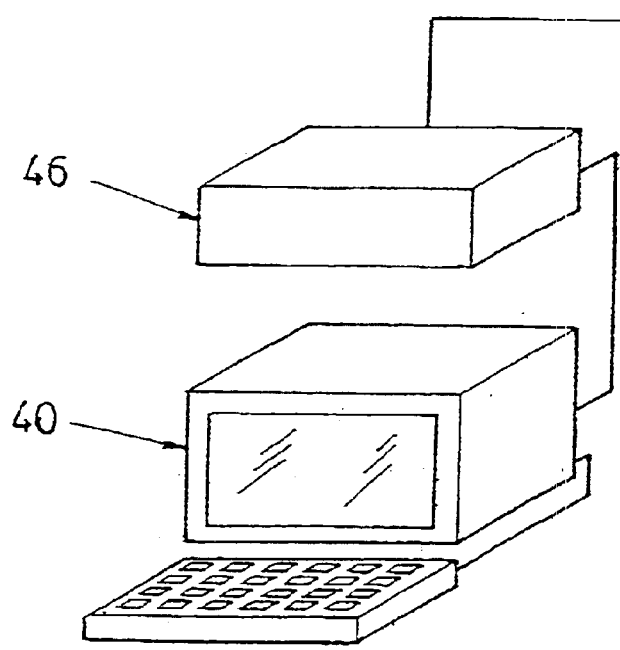

BAR CODE READER HAVING A ROTATORY OPTICAL DEFLECTOR AND A ROTATION POSITION DETECTOR

BACKGROUND OF THE INVENTION

1. Field of the Invention

The present invention relates to a bar code reader for reading a bar code by applying a laser beam emitted from a laser diode to the bar code, and receiving reflected light therefrom through a photodetector.

2. Description of the Related Art

A bar code reader for reading a bar code by the agency of reflected light of light applied from a light source towards the bar code is in widespread use today in the distribution sector, sales control division, and so forth because of its capability of reading the bar code even if the bar code reader is at a good distance away from the bar code.

Among such bar code readers, there is available one equipped with a portable laser scanning head which a user can hold in one hand. When reading a bar code printed on goods, and so forth, by use of the portable laser scanning head, a laser beam is caused to be emitted therefrom to be directed towards the bar code as a target of reading so as to reciprocatively scan the bar code in such a way as to cut across it, whereupon the laser beam reflected from the bar code is detected, and the bar code is read by decoding the detection signals (refer to, for example, JP, 5-233862, A, JP, 6-187481, A, and so forth).

Thus, with a bar code reader equipped with a laser diode, laser light emitted from the laser diode of the laser scanning head is rendered into a thin beam form. Such a laser beam is deflected by rotation of a rotary optical deflector such as a polygon mirror, galvanomirror, and so forth, thereby scanning a part (bar code surface) on which a bar code is printed.

However, because the laser light emitted by the laser diode is at a wavelength, close to that of an infrared ray, and in a boundary region between the visible region and the invisible region, it is difficult to visually recognize the laser beam in an environment of bright ambient light. In addition, because a scanning speed is very fast, there has arisen a problem that it is impossible to visually recognize a scanning position and a width of the laser beam on the bar code surface, and it is difficult to sight a scanning head on a bar code, rendering it difficult to read the bar code accurately and efficiently.

To overcome such a problem as described, there has been disclosed in, for example, JP, 5-233862, A, an optical scanning device equipped with an optical sighting mechanism for sighting a handy type laser scanning head on a bar code to be read by the same.

The optical sighting mechanism, however, requires a pair of light sources for sighting, an optical system associated therewith, and so forth, thereby rendering the constitution thereof complex, and increasing the number of components thereof, so that not only a high cost results, but also an application method thereof is far from simplicity.

Further, with a bar code reader disclosed in, for example, JP, 2000-90189, A, a proposal has been made to install a pair of mirrors for deflecting a laser beam scanning the vicinity of the opposite edges of a scanning range by the laser beam deflected by a scanning mirror which rotatively reciprocates, towards the center side of the scanning range. It is intended to thereby increase a quantity of light irradiated to a predetermined part in the vicinity of the center of the scanning range, so that visibility of a scanning line by the laser beam is enhanced.

With this method, however, there is a need of disposing the pair of the mirrors as added at a position closer to the bar code surface than the scanning mirror, thereby creating a problem in that the scanning head becomes larger. Furthermore, because the scanning line by the laser beam needs to be recognized in a state where scanning by the laser beam is executed by rotative reciprocation of the scanning mirror, it has still been difficult to visually recognize the scanning line if a scanning speed is fast.

SUMMARY OF THE INVENTION

The invention has been developed to solve such problems as described above, encountered by conventional bar code readers provided with a laser diode, and it is therefore an object of the invention to provide a bar code reader whose scanning position and a width of a laser beam on a bar code surface can be recognized without introduction of a complex mechanism and increasing the size of a scanning head even if a scanning speed of the laser beam is increased, so that anyone can easily implement focusing of the laser beam on a bar code of an optional length with the scanning head, enabling reading of the bar code to be executed accurately and efficiently.

Further, it is another object of the invention to enable either automatic scanning or manual scanning to be selected, and to enable reading of the bar code to be executed accurately and efficiently in either case.

To this end, there is provided a bar code reader provided with a laser diode and a rotatory optical deflector for deflecting a laser beam emitted by the laser diode for scanning, comprising a rotation position detection means for detecting a rotation position of the rotatory optical deflector at a position corresponding to a reading start edge of a laser beam scanning range of a bar code, a means for starting bar code reading by rotating the rotatory optical deflector again after stopping rotation of the rotatory optical deflector for only a predetermined time length upon the rotation position detection means detecting the rotation position of the rotatory optical deflector, and a means for stopping the rotation of the rotatory optical deflector for only a predetermined time length upon a laser beam scanning time length reaching a preset scanning time length up to the final position of the bar code reading after the bar code reading is started by the means for starting the bar code reading.

Or in place of the rotation position detection means described above, a rotation position detection means for detecting a rotation position of the rotatory optical deflector at a position before a reading start edge of a laser beam scanning range of a bar code may be provided, and bar code reading may be started by rotating the rotatory optical deflector again after stopping the rotation of the rotatory optical deflector for only a predetermined time length upon a laser beam scanning time length reaching a preset scanning time length up to a reading start position after the rotation position detection means detecting the rotation position of the rotatory optical deflector.

Further, with these features, a means for selecting either automatic scanning or manual scanning may be provided, and bar code reading may be started by rotating the rotatory optical deflector again after stopping the rotation of the rotatory optical deflector for only a predetermined time length upon the rotation position detection means detecting the rotation position of the rotatory optical deflector in the case of the automatic scanning being selected, subsequently stopping the rotation of the rotatory optical deflector for only a predetermined time length upon a laser beam scanning time length reaching a preset scanning time length up to the final position of the bar code reading, while the rotation of the rotatory optical deflector may be stopped through locking upon the laser beam scanning time length reaching a preset scanning time length up to the center position of the laser beam scanning range of the bar code after the rotation position detection means detecting the rotation position of the rotatory optical deflector in the case of the manual scanning being selected.

Otherwise, rotation of the rotatory optical deflector may be stopped for only a predetermined time length upon a laser beam scanning time length reaching a preset scanning time length up to a reading start position of the bar code reading after the rotation position detection means detecting the rotation position of the rotatory optical deflector in the case of the automatic scanning being selected, and subsequently, bar code reading may be started by rotating the rotatory optical deflector again, stopping the rotation of the rotatory optical deflector for only a predetermined time length upon the laser beam scanning time length reaching a preset scanning time length up to the final reading position of the bar code reading, while the rotation of the rotatory optical deflector may be stopped through locking upon the laser beam scanning time length reaching a preset scanning time length up to the center position of the laser beam scanning range of the bar code after the rotation position detection means detecting the rotation position of the rotatory optical deflector in the case of the manual scanning being selected.

Further, a first fixed optical deflector may be disposed in front of a collimator lens for rendering the laser light emitted by the laser diode into a laser beam of parallel light rays, in the outgoing direction of the laser beam, such that the laser beam deflected by the first fixed optical deflector is rotationally deflected by the rotatory optical deflector described above so as to scan the bar code, and a second fixed optical deflector may be provided so as to deflect the laser beam deflected by the first fixed optical deflector in a given direction when the rotatory optical deflector is situated in a rotation position outside the optical path of the laser beam described.

The second fixed optical deflector is preferably disposed on a side of the rotatory optical deflector, opposite from the first fixed optical deflector.

It is more preferable that the second fixed optical deflector is made up of a translucent reflector so as to reflect a portion of the laser beam falling on the second fixed optical deflector to be deflected into the given direction, allowing the rest of the laser beam to be transmitted therethrough, and a third fixed optical deflector is provided so as to deflect a transmitted portion of the laser beam into a direction differing from the given direction.

In such a case, the second fixed optical deflector is preferably disposed on a side of the rotatory optical deflector, opposite from the first fixed optical deflector, and the third fixed optical deflector is disposed further behind the second fixed optical deflector.

Further, the invention is preferably provided with the rotation position detection means for detecting the rotation position of the rotatory optical deflector, and temporary rotation stoppage means for stopping rotation of the rotatory optical deflector for only a predetermined time length when it is decided on the basis of the detection result of the rotation position detection means that the rotatory optical deflector is situated in the rotation position outside the optical path of the laser beam deflected by the first fixed optical deflector.

In other respect, with a bar code reader provided with a means for selecting either automatic scanning or manual scanning, there may be provided a rotation position detection means for detecting a rotation position of the rotatory optical deflector at two spots corresponding to the opposite edges of the laser beam scanning range of the bar code, respectively, and at a spot situated between the two spots, and means for stopping rotation of the rotatory optical deflector for only a predetermined time length upon the rotation position detection means detecting the rotation position of the rotatory optical deflector at the two spots, respectively, in the case of the automatic scanning being selected, and for stopping the rotation of the rotatory optical deflector through locking upon the rotation position detection means detecting the rotation position of the rotatory optical deflector at the spot situated between the two spots in the case of the manual scanning being selected.

With these features, there may be provided a means for slowing down a rotation speed of the rotatory optical deflector during a period of bar code reading from a time of the rotation position detection means detecting one of the rotation positions at the two spots up to the rotation position detection means detecting the other of the rotation positions, while rotating the rotatory optical deflector at a higher speed at other times in the case of the automatic scanning being selected, and for stopping the rotation of the rotatory optical deflector through locking upon the rotation position detection means detecting the rotation position of the rotatory optical deflector at the spot situated between the two spots in the case of the manual scanning being selected.

Otherwise, there may be provided a means for detecting rotation positions of the rotatory optical deflector at two spots corresponding to the opposite edges of the laser beam scanning range of the bar code, respectively, and means for stopping rotation of the rotatory optical deflector for only a predetermined time length upon the means detecting the rotation positions of the rotatory optical deflector at the two spots, respectively.

Or it is preferable to provide means for reducing a rotation speed of the rotatory optical deflector during a time period from a time of the rotation position detection means described above detecting a rotation position of the rotatory optical deflector corresponding to the scanning start edge, up to a time of the rotation position detection means detecting a rotation position of the rotatory optical deflector corresponding to a scanning completion edge, from a rotation speed at other times.

The above and other objects, features and advantages of the invention will be apparent from the following detailed description which is to be read in conjunction with the accompanying drawings.

BRIEF DESCRIPTION OF THE DRAWINGS

FIGS. 25 to 27 are views showing examples of menu display for setting respective scanning time lengths for bar code reading;

FIG. 29 is a perspective view thereof, showing the constitution of a scanning head thereof in more details;

DETAILED DESCRIPTION OF THE PREFERRED EMBODIMENTS

A plurality of preferred embodiments of the invention are specifically described hereinafter with reference to the accompanying drawings respectively.

First Embodiment: FIGS. 1 to 27

First, a first embodiment of a bar code reader according to the invention, and other embodiments representing a partial modification of the first embodiment are described hereinafter with reference to FIGS. 1 to 27.

Figure 1:
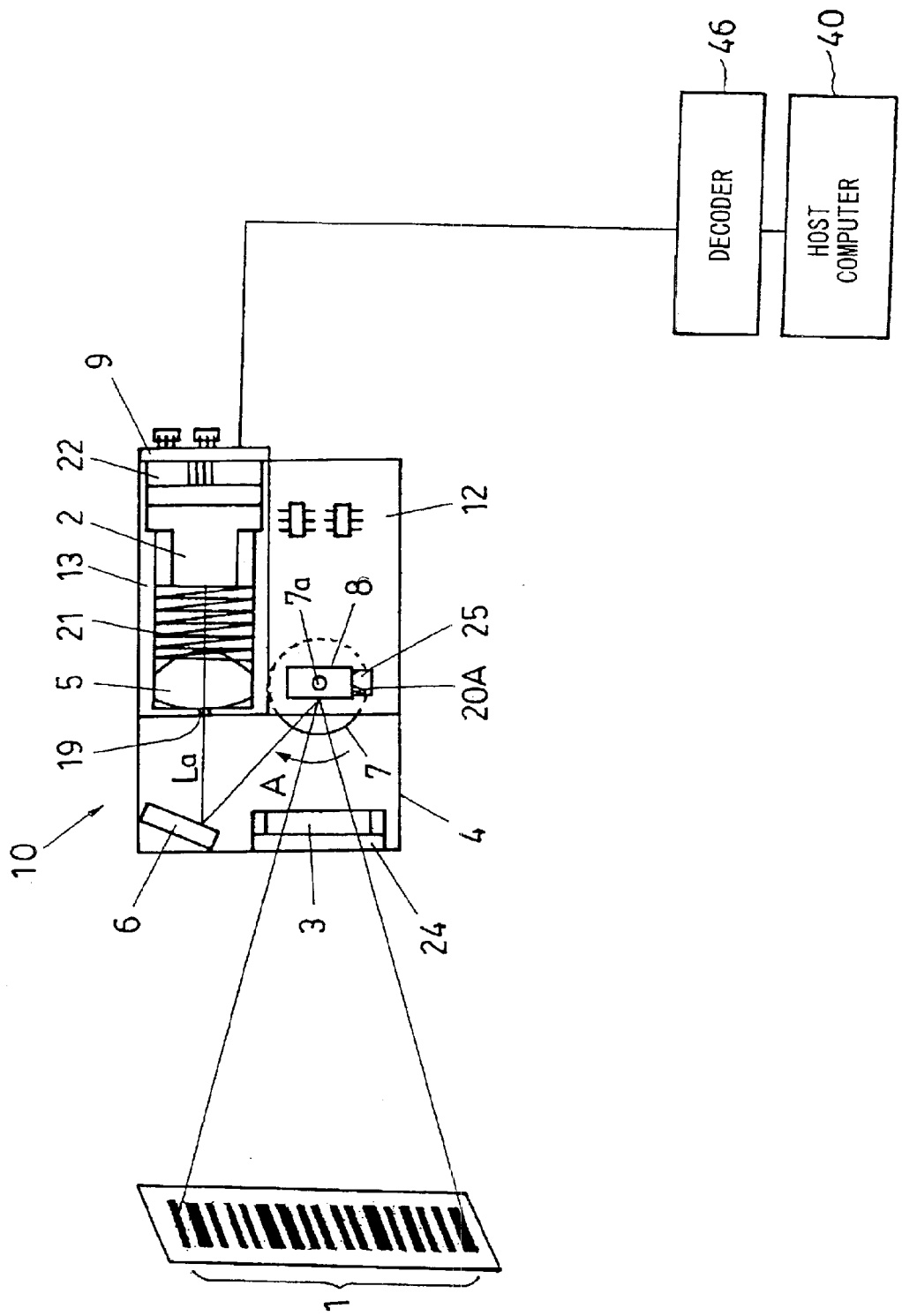
FIG. 1 is a schematic plan view of a first embodiment of a bar code reader according to the invention, showing a state of bar code reading.
Figure 2:
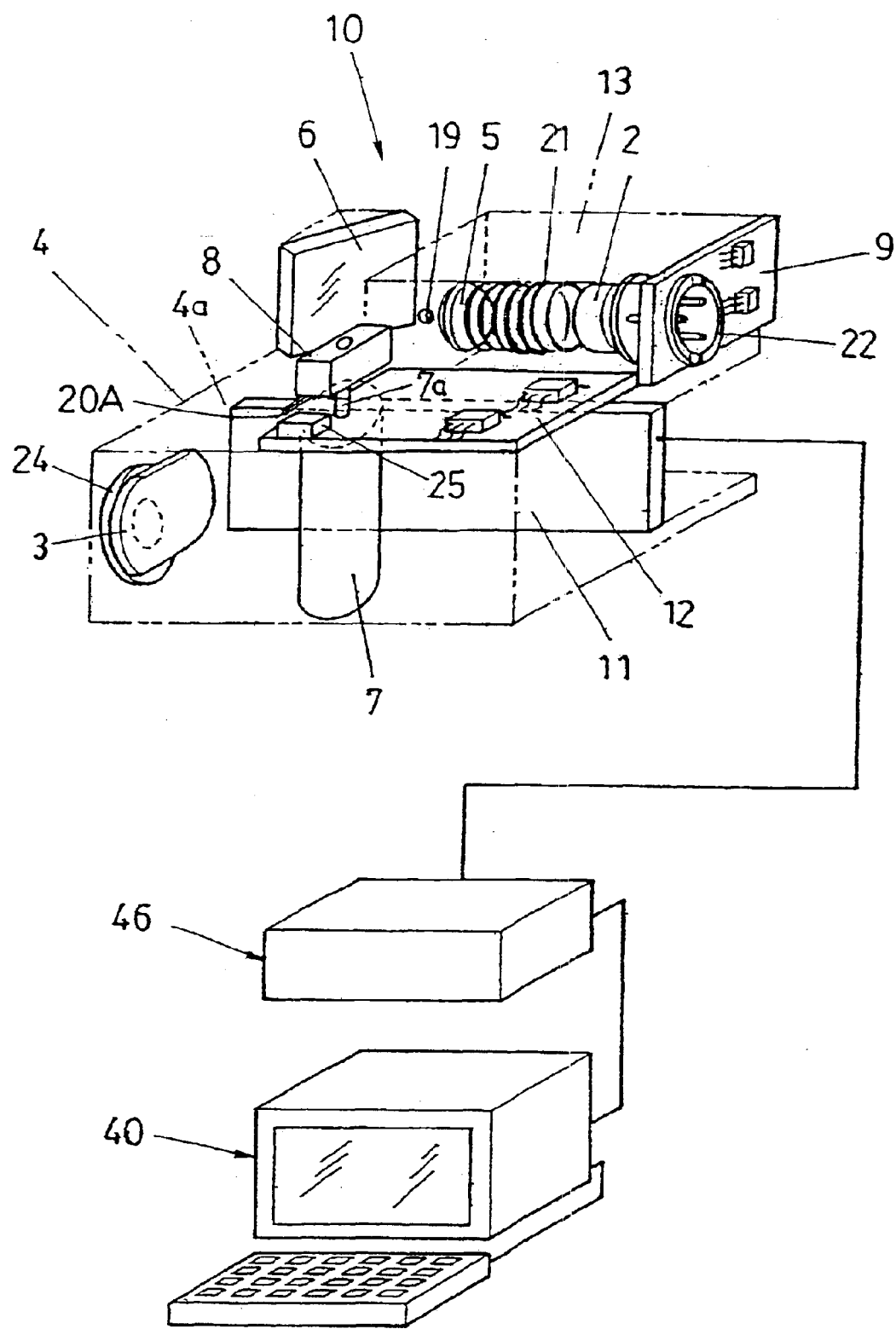
FIG. 2 is a perspective view thereof, showing the constitution of a scanning head thereof in more details.

FIG. 1 is a schematic plan view of the first embodiment of the bar code reader according to the invention, showing a state of bar code reading, and FIG. 2 is a perspective view thereof, showing the constitution thereof in more details.

A scanning head 10 of the bar code reader is housed in a pen-type case (not shown), and as shown in FIG. 1, has a function of reading numerals and signs, as expressed by a combination of bars wider in width, bars narrower in width, and respective spacings between the bars adjacent to each other, making up a bar code 1, by applying a laser beam onto the bar code 1.

For that end, laser light emitted by a laser diode 2 is rendered into parallel light rays through a collimator lens 5, and a laser beam La in a thin beam form is sent out from an aperture 19 provided on the front end face of a light emitting box 13. Then, the laser beam La is applied towards the bar code 1 via a mirror 6 which is an optical deflector, and a rotatory mirror 8 which is a rotatory optical deflector for scanning, thereby scanning the bar code 1 from the lower edge thereof to the upper edge thereof in FIG. 1 by rotation of the rotatory mirror 8 in the direction of the arrow A. At this point in time, reflected light from the bar code 1 is received by a photoreceptor device 3 which is, for example, a photodiode, and the like, and is converted into an electric signal which varies depending on an intensity of the reflected light.

Data obtained through binarization of the electric signal are sent out to a decoder 46 for decoding the data into numerals, signs, and so forth, and decoded data are inputted to a host computer 40.

In this connection, it is to be pointed out that the scanning head 10 of the bar code reader constructed by assembling various components onto a retaining member 4 is shown in an enlarged state in FIG. 2 so as to look larger than the decoder 46 and the host computer 40, however, it can, in fact, be housed in a pen-type case in a small portable size.

The constitution of the scanning head 10 of the bar code reader is described in greater detail as follows. The light emitting box 13 is provided integrally with the retaining member 4, and a laser diode control substrate 9 is fixedly attached to the rear end of the light emitting box 13, so that the laser diode 2 is securely held at a predetermined position inside the light emitting box 13 by a laser diode fixture member 22 provided on the laser diode control substrate 9.

Inside the light emitting box 13, there is further provided the collimator lens 5 such that the optical axis thereof coincides with a line interconnecting the center of the aperture 19 provided on the front end face of the light emitting box 13 and the light-emitting center of the laser diode 2, and a coil spring 21 is interposed between the collimator lens 5 and the laser diode 2.

Further, attached to the retaining member 4 by use of a setscrew (not shown), respectively, are the mirror 6, that is, the optical deflector, a motor 7 with the rotatory mirror 8 which is the rotatory optical deflector for scanning fixedly attached to a rotatory shaft 7a thereof, a scanning control substrate 12 including a motor control circuit for the motor 7, the photodetector 3 securely held on the inner side of an opening of the front end face of the retaining member 4 by a photodetector fixture member 24, and an electric signal processing substrate 11 provided with a circuit for both driving the photodetector 3 and processing detection signals therefrom.

Figure 3:
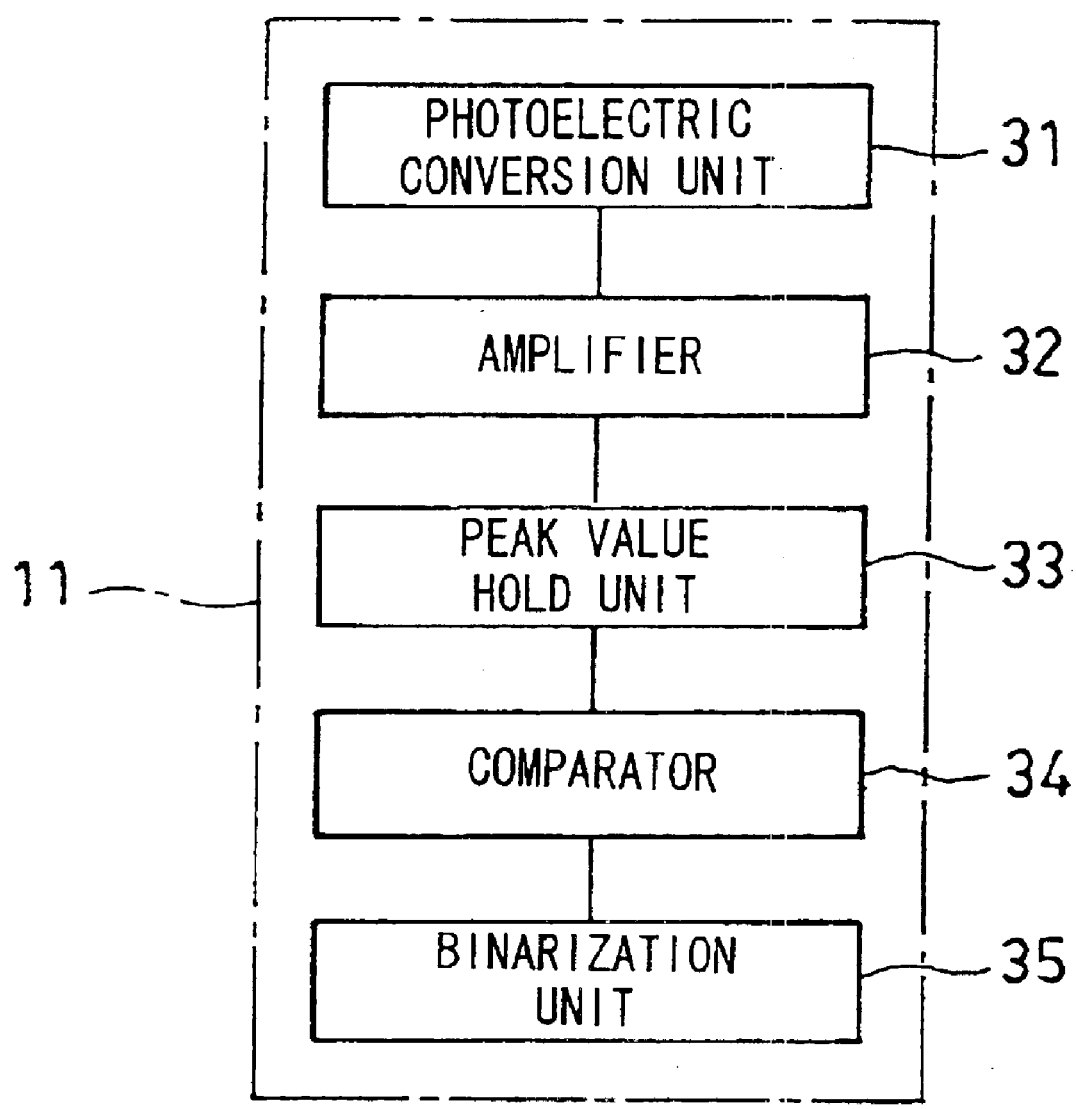
FIG. 3 is a block diagram showing a function makeup of a signal processing unit installed on an electric signal processing substrate in FIG. 2.

The electric signal processing substrate 11 is a substrate on which respective units for driving the photodetector 3 and also for processing electric signals outputted by the photodetector 3 are installed, comprising a photoelectric conversion unit 31, an amplifier 32, a peak value hold unit 33, a comparator 34, and a binarization unit 35, as shown in FIG. 3.

As is evident from FIG. 2, the rotatory mirror 8 is in a cuboid shape, and one face thereof is rendered specular by means of vapor deposition of aluminum, so that a laser beam traveling from the mirror 6 undergoes deflection when the laser beam is applied to the face of the rotatory mirror 8 and reflected therefrom, and the laser beam as reflected scans the bar code 1 which is shined therewith by causing the rotatory mirror 8 to be rotated by the motor 7.

Figure 4:
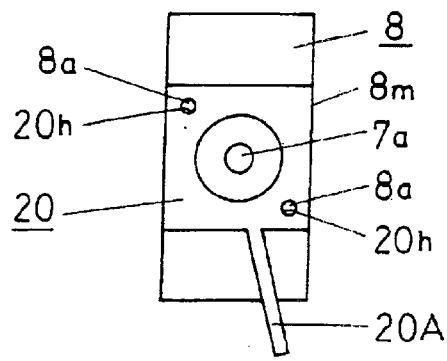
FIG. 4 is a view of a rotatory mirror shown in FIGS. 1 and 2, as seen from the underside thereof.
Figure 5:
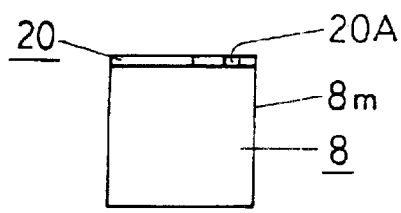
FIG. 5 is a front elevation of the rotatory mirror.
Figure 6:
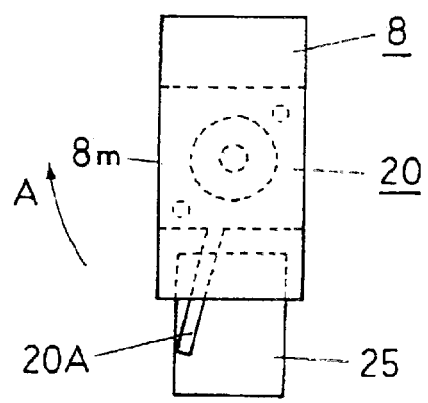
FIG. 6 is a view of the rotatory mirror shown in FIGS. 1 and 2, as seen from the topside of the rotatory mirror, showing the configuration of a plate for detection and a reflection type photosensor.

Herein, a rotation position detection means of the rotatory mirror 8 is described. FIG. 4 is a view of a plate for detection 20 as seen from the underside of the rotatory mirror 8, and FIG. 5 is a front elevation of the plate for detection 20. FIG. 6 is a view showing the configuration of the plate for detection 20 and a reflection type photosensor 25 as seen from the topside of the rotatory mirror 8, and FIG. 7 is a front elevation thereof.

As shown in FIGS. 4 and 5, a pair of protrusions 8a, 8a for positioning disposed so as to diametrically oppose each other across the rotatory shaft 7a, are provided on the underside face of the rotatory mirror 8 with a reflection face 8m formed thereon, and by fitting the pair of the protrusions 8a, 8a for positioning into a pair of positioning holes 20h, 20h, respectively, the plate for detection 20 is fixedly attached to the rotatory mirror 8 through bonding, caulking, and so forth. The plate for detection 20 is provided with a strip 20A as a sensing indicator for detecting a rotation position of the rotatory mirror 8, extending radially from the center of the rotatory shaft 7a such that the tip of the strip 20A protrudes from one of edge faces of the rotatory mirror 8.

Figure 7:
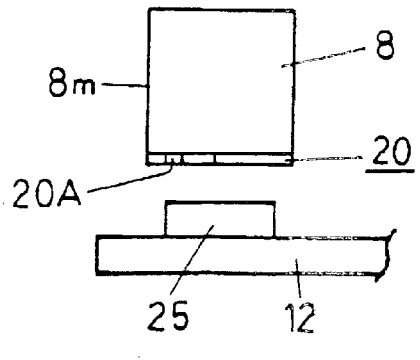
FIG. 7 is a front elevation thereof, showing the configuration of the plate for detection and the reflection type photosensor.

As shown in FIGS. 6 and 7, the reflection type photosensor 25 is disposed on the scanning control substrate 12 and below a passing position of the strip 20A, thereby enabling the strip 20A to be sensed at a rotation position of the rotatory mirror 8 corresponding to a reading start edge of a laser beam scanning range of the bar code 1.

The scanning control substrate 12 includes a circuit for detecting the rotation position of the rotatory mirror 8 corresponding to the reading start edge by sensing passage of the strip 20A by the agency of the reflection type photosensor 25, and a circuit for controlling operation of the motor 7 by discriminating the detection signal.

Figure 8:
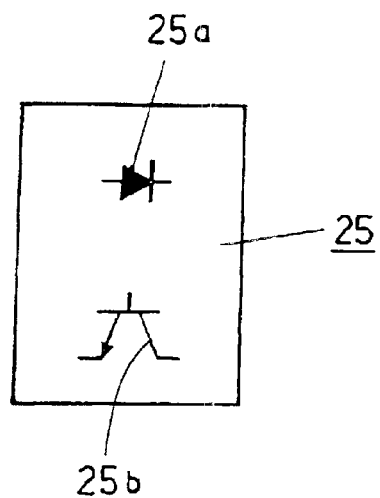
FIG. 8 is a circuit symbol view showing the makeup of the reflection type photosensor shown in FIG. 7.

As shown in FIG. 8, the reflection type photosensor 25 is a photosensor provided with a light emitting device 25a such as an LED, integral with a photodetector 25b such as a phototransistor, wherein reflected light from an object shined by light emitted by the light emitting device 25a is sensed by the photodetector 25b.

The strip 20A of the plate for detection 20 and the reflection type photosensor 25 are disposed at respective positions with a spacing interposed therebetween such that the sensitivity is at the highest level. Further, with the reflection type photosensor 25, the light emitting device 25a is disposed on the rotatory shaft 7a side (on the inner side) thereof, and the photodetector 25b is disposed on the outer side thereof, thereby ensuring that the light emitting device 25a can shine the strip 20A coming directly thereabove with light, and the photodetector 25b can effectively receive reflected light of such light.

Further, consideration should be given such that the difference in reflectance between the underside face of the rotatory mirror 8 and the plate for detection 20 is increased. For example, a black polycarbonate material is used for the underside face of the rotatory mirror 8 while stainless steel is used for the plate for detection 20 so as to indicate reflectance substantially equivalent to that of a white color.

Furthermore, any of the scanning control substrate 12, the laser diode control substrate 9, and the electric signal processing substrate 11 is provided with a microcomputer for executing overall control of respective units of the scanning head 10.

Figure 9:
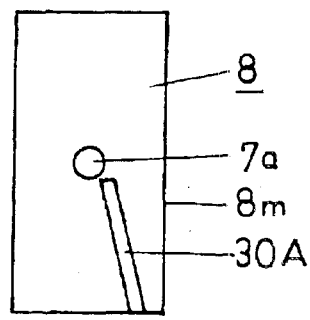
FIGS. 9 and 10 are views of another example of a sensing indicator, similar to FIGS. 4 and 5, respectively.
Figure 10:
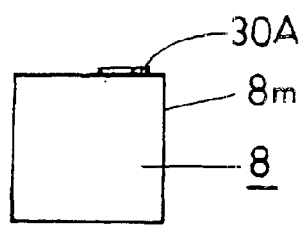
Figure 11:
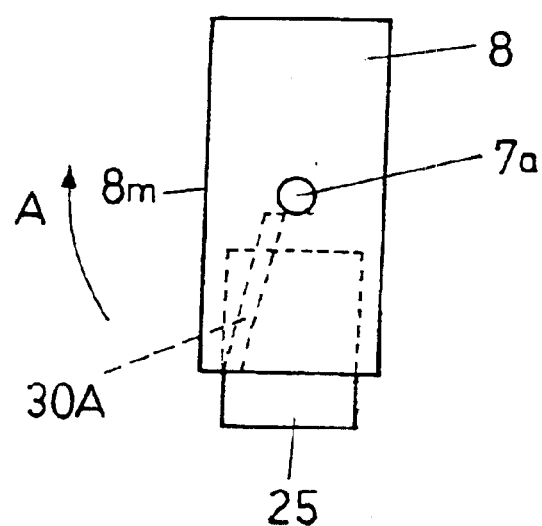
FIGS. 11 and 12 are views of the example of a sensing indicator, similar to FIGS. 6 and 7, respectively.
Figure 12:
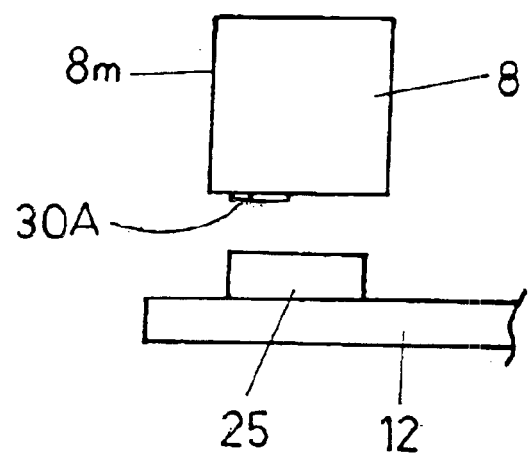

FIGS. 9 to 12 are views showing another example of a sensing indicator for detecting a rotation position of a rotatory mirror 8, FIG. 9 is a view thereof as seen from the underside of the rotatory mirror 8, FIG. 10 is a front elevation thereof, FIG. 11 is a view showing the configuration of the sensing indicator and a reflection type photosensor as seen from the topside of the rotatory mirror 8, and FIG. 12 is a front elevation thereof.

As shown in FIGS. 9 and 10, with this example, a coated stripe 30A as a sensing indicator for detecting a rotation position of the rotatory mirror 8, is formed on the underside face of the rotatory mirror 8 with a reflection face 8m formed thereon in such a way as to extend in a radial direction from the center of the rotatory shaft 7a towards one of edge faces of the rotatory mirror 8 by printing with ink or by applying paint.

The coated stripe 30A is formed by spray painting the underside face of the rotatory mirror 8 made of, for example, a black polycarbonate material with a white paint such that the difference in reflectance between the underside face of the rotatory mirror 8 and the coated stripe 30A is increased.

Further, as shown in FIGS. 11 and 12, a reflection type photosensor 25 is disposed on the scanning control substrate 12 and below a passing position of the coated stripe 30A.

Since the constitution and operation of this example, in other respects, are the same as those for the case of the embodiment previously described with reference to FIGS. 4 to 8, description thereof is omitted.

Figure 14:
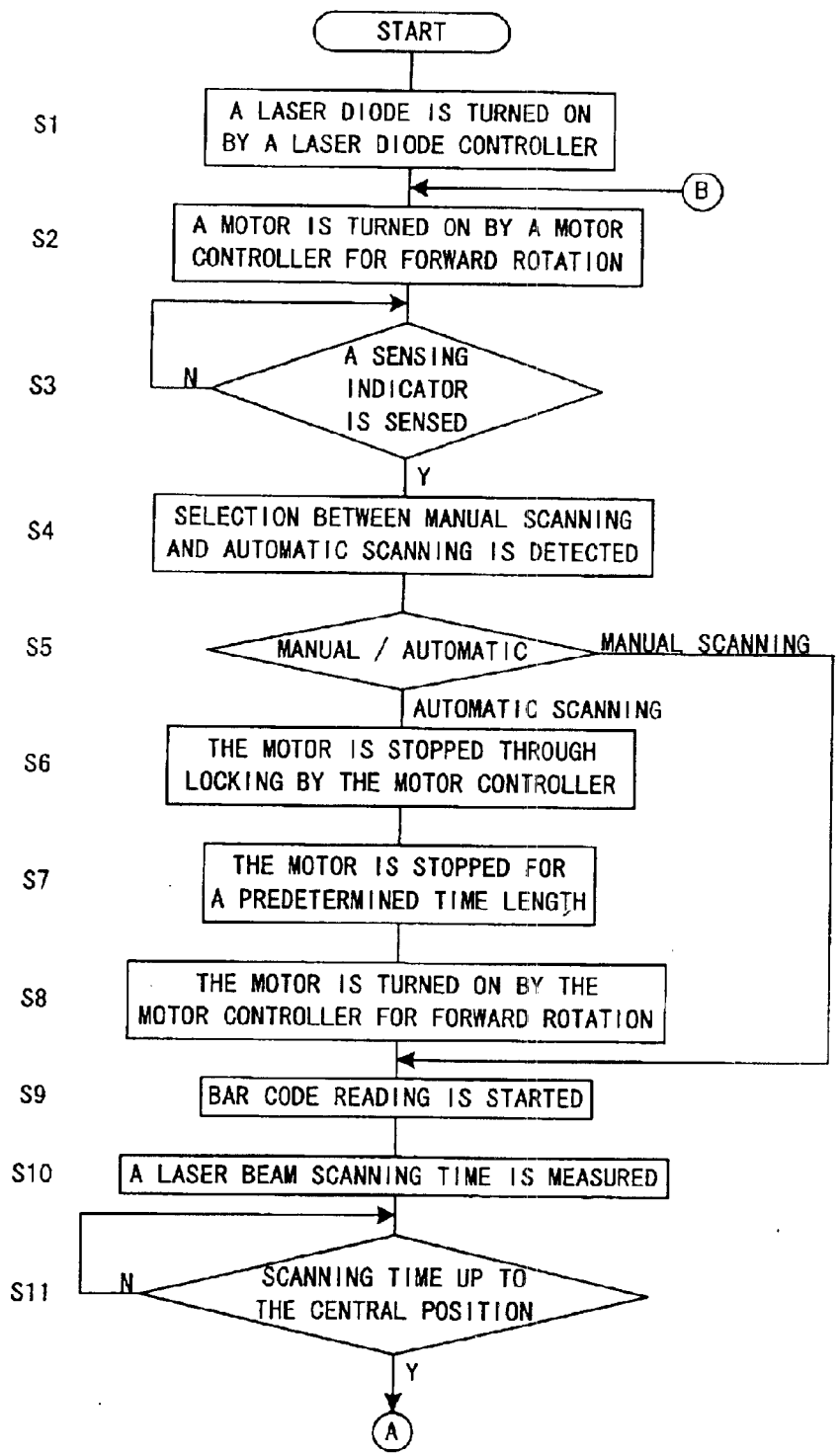
FIGS. 14 and 15 are flow charts showing a control process flow at the scanning head of the bar code reader shown in FIGS. 1 and 2 in the case where either automatic scanning or manual scanning is selectable.
Figure 15:
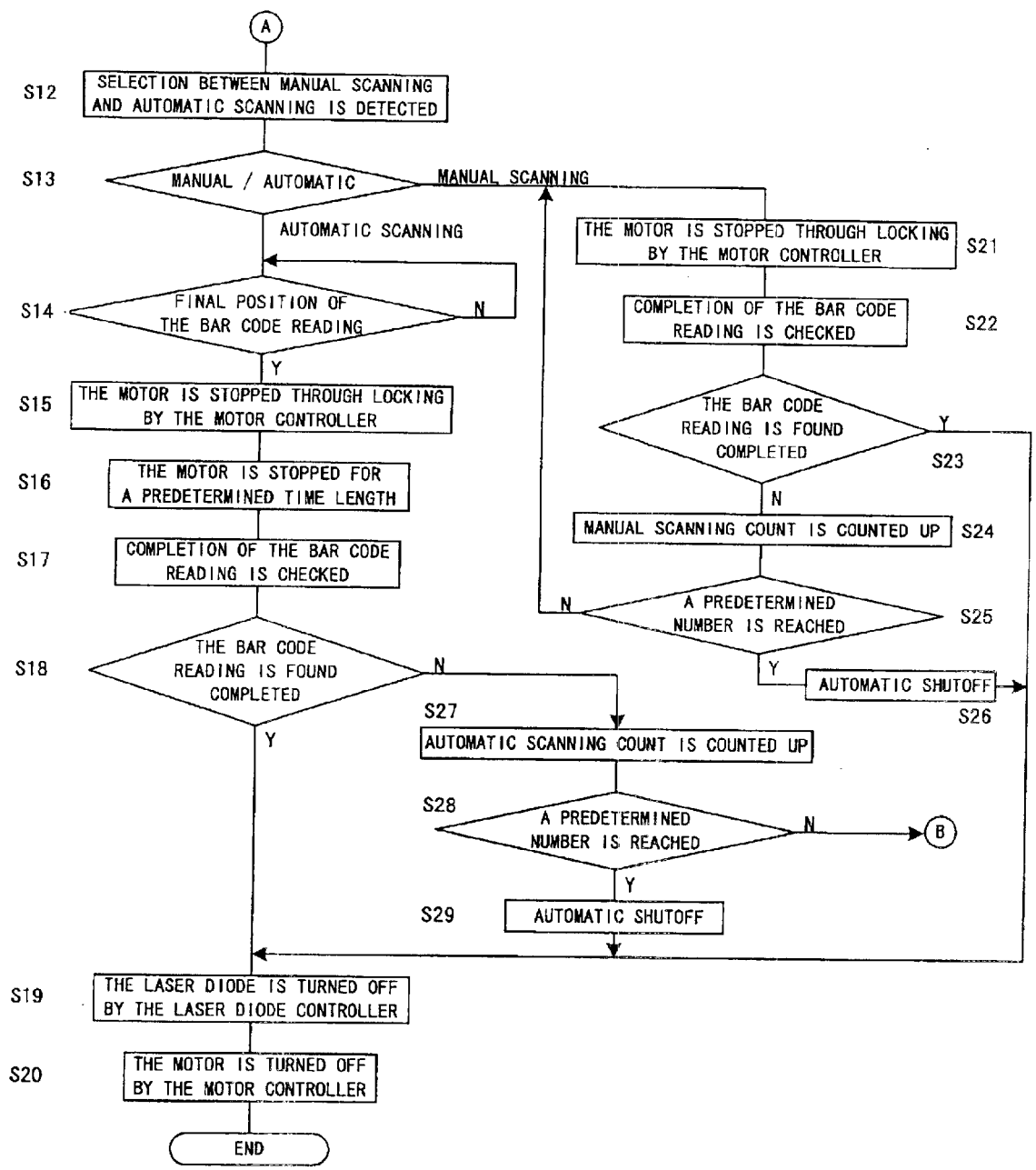

A control process of the scanning head 10 of the bar code reader will be described hereinafter by referring to flow charts shown in FIGS. 13 to 17. FIGS. 14 and 15 shows one continuous flow chart, however, for convenience in illustration, it is divided into two flow charts. Control shown in these flow charts is executed by a command from the microcomputer for executing overall control of the respective units of the scanning head 10, installed on any of the substrates 9, 11 and 12.

First, referring to FIG. 13, a control process in the case of automatic control only will be described hereinafter.

When start of bar code reading is instructed with a switch (not shown) or the like, this process is started.

First, in a step S1, the laser diode 2 is turned ON (caused to emit light) by a laser diode controller. Subsequently, in a step S2, the motor 7 is turned ON by a motor controller to be driven for forward rotation.

In a step S3, the process waits for the reflection type photosensor 25 to sense the sensing indicator (the strip 20A or the coated stripe 30A), and upon sensing the sensing indicator, the motor 7 is stopped through locking by the motor controller in a step S4.

It is meant by "stopped through locking" herein that in the case of using a DC motor with brushes/coreless for the motor 7, a voltage to drive the motor 7 for reverse rotation is applied to the motor 7 through control of the motor controller so as to apply brake thereto, and thereafter, the voltage is cut off, thereby turning OFF the motor 7. Accordingly, even if the motor 7 is turned OFF, it will not be moved with a small load applied thereto. In the case of using a stepping motor capable of high speed control, the motor is locked by causing holding current to flow therethrough.

Thereafter, in a step S5, the motor 7 is stopped for only a predetermined time length as optionally preset, and in a step S6, the motor 7 is turned ON again to be driven for forward rotation.

Subsequently, in a step S7, the bar code reading is started, and in a step S8, measurement of a laser beam scanning time by the rotatory mirror 8 is started. In a step S9, the process waits until a measurement time reaches a preset scanning time length up to the final position of the bar code reading, and upon reaching the preset scanning time length, the motor 7 is stopped through locking in a step S10.

Thereafter, in a step S11, the motor 7 is stopped for a predetermined time length as optionally preset, and in a step S12, completion of the bar code reading is checked. If the bar code reading is found completed in a step S13, the laser diode 2 is turned OFF (puts out light) by the laser diode controller in a step S14. Finally, in a step S15, the motor 7 is turned OFF by the motor controller, thereby completing this process.

If the bar code reading is found uncompleted in the step S13, execution count is counted up in a step S16, and the process reverts to the step S2 before a predetermined number of the execution count is reached in a step S17, waiting for the reflection type photosensor 25 to sense the sensing indicator (the strip 20A or the coated stripe 30A) again after the rotatory mirror 8 making approximately one turn by turning the motor 7 ON to be driven for forward rotation. Thereafter, a series of the steps described above are repeated.

However, in case the bar code reading is not completed even after executing the bar code reading the predetermined number of times in accordance with the series of the steps, the predetermined number of execution count will be reached in the step S17, and thereby an automatic shutoff process will be activated in a step S18, turning OFF the laser diode 2 and the motor 7 in accordance with the previously-described steps 14 and 15, respectively. Thus, the whole process is completed.

With this embodiment of the invention, since rotation of the motor is controlled such that scanning by the laser beam is stopped for a predetermined time length by sensing the sensing indicator before start of the bar code reading, and scanning by the laser beam is also stopped for a predetermined time length at the final position of the bar code reading, it is possible to easily recognize the laser beam when the scanning is stopped at the opposite ends of the bar code, and to check the scanning position and the width of the laser beam on the bar code surface, thereby enabling manual adjustment to optimize the scanning position with ease.

This embodiment may be slightly modified such that the reflection type photosensor 25 is able to sense the sensing indicator (the strip 20A or the coated stripe 30A) before a position corresponding to the reading start edge of the laser beam scanning range of the bar code.

Figure 13:
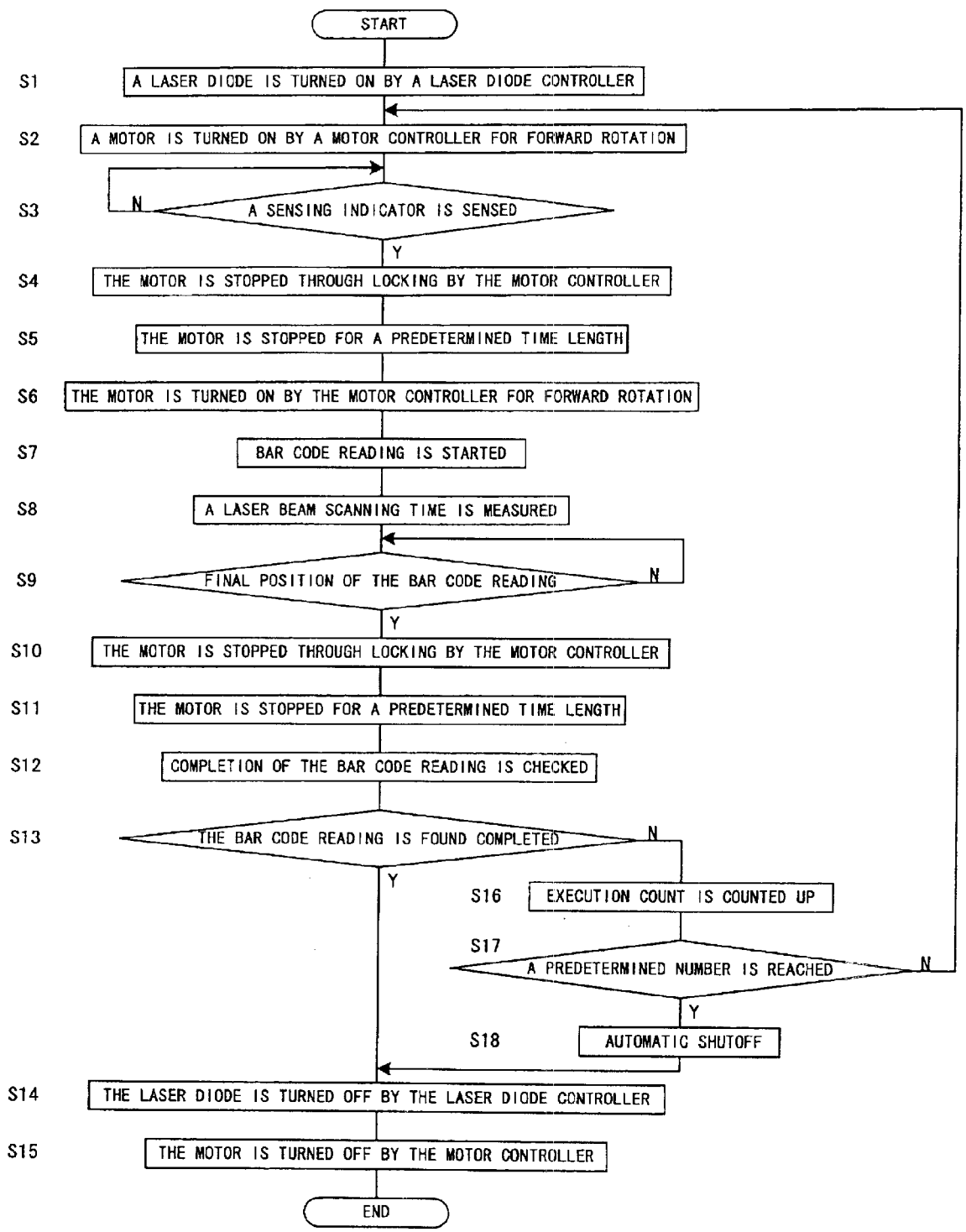
FIG. 13 is a flow chart showing a control process flow at the scanning head of the bar code reader shown in FIGS. 1 and 2 in the case of automatic control only.
Figure 16:
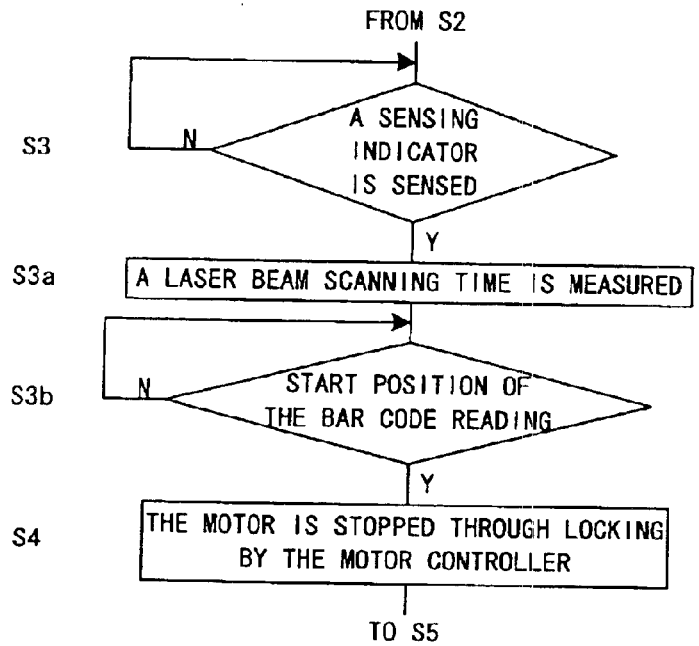
FIG. 16 is a partial flow chart showing an example where the flow chart in FIG. 13 is slightly modified.

In such a case, between the steps S3 and S4 in FIG. 13, steps S3a and S3b as shown in FIG. 16 are provided.

That is, upon the reflection type photosensor 25 sensing the sensing indicator (the strip 20A or the coated stripe 30A) in the step S3, the measurement of the laser beam scanning time is started in the step S3a, and the process waits until the laser beam scanning time reaches a preset scanning time length up to a start position of the bar code reading in the step S3b. Upon reaching such the preset scanning time length, the process proceeds to the step S4, and the motor 7 is stopped through locking by the motor controller.

Steps of the process, taken thereafter, are the same as the steps S5 and onwards, as shown in FIG. 13. However, "measurement of a laser beam scanning time" as in the step S8 may be omitted if measurement is taken continuously from "the measurement of the laser beam scanning time" as in the step S3a.

Subsequently, a control process in the case where either automatic scanning or manual scanning is selectable will be described hereinafter with reference to FIGS. 14 and 15.

When start of bar code reading is instructed with a switch (not shown) or the like, this process is started.

First, in a step S1 in FIG. 14, the laser diode 2 is turned ON (caused to emit light) by the laser diode controller.

Subsequently, in a step S2, the motor 7 is turned ON by the motor controller, thereby driving the rotary mirror 8 for forward rotation (rotation in the direction of the arrow A in FIG. 1).

Then, in a step S3, the process waits for the reflection type photosensor 25 to sense the sensing indicator (the strip 20A or the coated stripe 30A), and upon sensing the same, selection between manual scanning and automatic scanning is detected in a step S4. A method of selection will be described in detail later on. Subsequently, in a step S5, discrimination is made on whether a detection result indicates the manual scanning or the automatic scanning.

In the case of the manual scanning, the process proceeds directly to a step S10 wherein measurement of a laser beam scanning time by the rotary mirror 8 is started.

In the case of the automatic scanning, the process proceeds to a step S6 wherein the motor 7 is stopped through locking by the motor controller. Thereafter, in a step S7, the motor 7 is stopped for a predetermined time length as optionally preset, and in a step S8, the motor 7 is turned ON again, thereby driving the rotary mirror 8 for forward rotation.

Subsequently, in a step S9, the bar code reading is started, and in a step S10, measurement of the laser beam scanning time by the rotary mirror 8 is started.

Thereafter, in a step S11, the control process waits until a measurement time reaches a scanning time length up to the central position of the laser beam scanning range of the bar code (half of the preset scanning time length up to the final position of the bar code reading), and upon reaching the scanning time length up to the central position, proceeds to a step S12 in FIG. 15, wherein selection of either manual scanning or automatic scanning is detected again. Subsequently, in a step S13, discrimination is made on whether a detection result indicates the manual scanning or the automatic scanning.

In the case of the automatic scanning, the control process proceeds to a step S14, wherein the bar code reading is continued until the previously-described measurement time reaches a preset scanning time length up to the final position of the bar code reading, and upon reaching the preset scanning time length up to the final position of the bar code reading, the motor 7 is stopped through locking by the motor controller in a step S15. Thereafter, in a step S16, the motor 7 is stopped for only a predetermined time length as optionally preset, and in a step S17, completion of the bar code reading is checked.

Further, in a step S18, decision is made on whether or not the bar code reading is completed, and if the bar code reading is found completed, the process proceeds to a step S19, wherein the laser diode 2 is turned OFF by the laser diode controller. Subsequently, in a step S20, the motor 7 is turned OFF by the motor controller, thereby completing the process.

If decision is made in the step S18 that the bar code reading is found uncompleted, the process proceeds to a step S27, wherein automatic scanning count is counted up, and in a step S28, decision is made on whether or not a predetermined number of the automatic scanning count has been reached. If it is decided that the predetermined number has not been reached as yet, the process reverts to the step S2 in FIG. 14, wherein the motor 7 is turned ON, and thereby the rotary mirror 8 is driven for forward rotation, repeating the previously-described steps of processing.

If it is decided in the step S28 that the predetermined number has been reached, an automatic shutoff function is activated in a step S29, whereupon the process proceeds to the step S19 and the step S20, thereby turning OFF the laser diode 2 and the motor 7, respectively. Thus, the process is completed.

Meanwhile, in the case where it is decided in the step S13 that the detection result indicates the manual scanning, the process proceeds to a step S21 wherein the motor 7 is stopped through locking by the motor controller, and the rotary mirror 8 is stopped, thereby stopping scanning by the laser beam at the central position of an automatic scanning range. Thereafter, the bar code 1 is scanned by manually shifting the scanning head 10, and the process waits for completion of the bar code reading.

In a step S22, completion of the bar code reading is checked, and in a step S23, decision is made on whether or not the bar code reading has been completed.

If it is decided as a result that the bar code reading has been completed, the process proceeds to the step S19 and the step S20, and thereby the laser diode 2 and the motor 7 are turned OFF, thus completing the process.

If it is decided that the bar code reading has not been completed, manual scanning count is counted up in a step S24, and decision is made on whether or not a predetermined number of the manual scanning count has been reached in a step S25.

If it is decided that the predetermined number of the manual scanning count has not been reached as yet, the process reverts to the step S21, continuing stoppage of the motor 7 and the rotary mirror 8, and waits for completion of the bar code reading by means of the manual reading while the previously-described steps up to the step S25 are repeated.

However, if it is decided that the predetermined number of the manual scanning count has been reached in the step S25, the process proceeds to a step S26 wherein the automatic shutoff function is activated, and thereafter, proceeds to the steps S19 and S20 wherein the laser diode 2 and the motor 7 are turned OFF, thus completing the process.

With this embodiment of the invention, either the automatic scanning or the manual scanning is optionally selectable, and in the case of the automatic scanning, rotation of the motor 7 for rotating the rotary mirror 8 is controlled such that scanning by the laser beam is stopped for the predetermined time length by sensing the sensing indicator before the start of the bar code reading, and scanning by the laser beam is also stopped for the predetermined time length at the final position of the bar code reading. Accordingly, it is possible to easily recognize the laser beam when the scanning is stopped at the opposite ends of the bar code, and to check the scanning position and the width of the laser beam on the bar code surface, thereby enabling the manual adjustment to optimize the scanning position with ease.

Further, in the case of the manual scanning, since the motor 7 is locked and stopped at the center of the scanning range of the bar code following rotation of the rotary mirror 8, scanning by the laser beam is also stopped, so that the bar code can be manually scanned and read with reliability while visually recognizing the laser beam.

As for means of selection between the automatic scanning and the manual scanning, no particular description is given, however, a switch for auto/manual changeover may be installed at a suitable position on the case for housing the scanning head 10, or selection may be executed by combination manipulation of a plurality of switches as with the case of another embodiment described later on.

Furthermore, setting of the scanning time length up to the final position of the bar code reading by the laser beam, and setting of the predetermined time length for stopping rotation of the rotatory mirror 8 may be executed by use of respective setting switches installed on the case for housing the scanning head 10, or by combination manipulation of the plurality of switches.

This embodiment may be slightly modified such that the reflection type photosensor 25 is able to sense the sensing indicator (the strip 20A or the coated stripe 30A) before the position corresponding to the reading start edge of the laser beam scanning range of the bar code.

Figure 17:
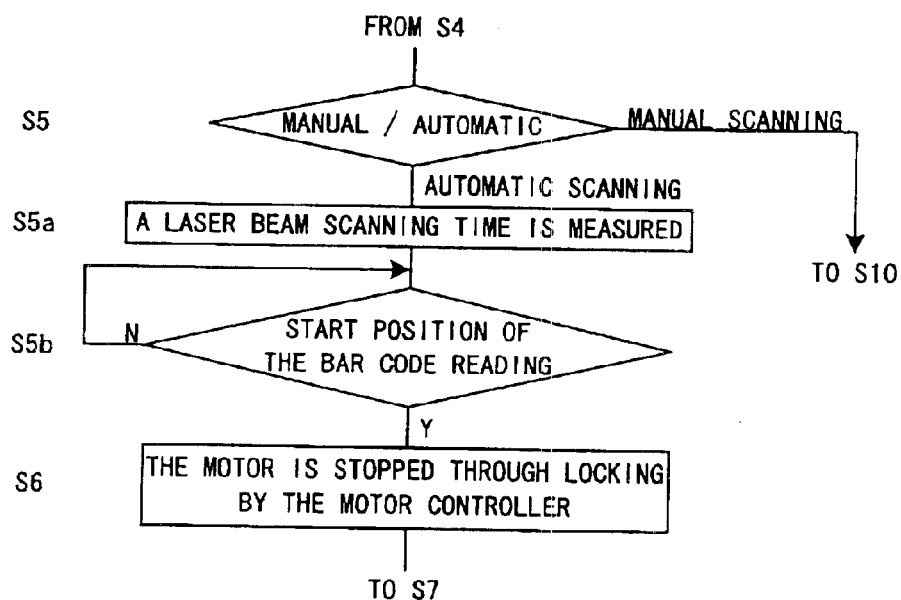
FIG. 17 is a partial flow chart showing an example where the flow chart in FIG. 14 is slightly modified.

In such a case, between the steps S5 and S6 in FIG. 14, steps S5*a* and S5*b* as shown in FIG. 17 are provided.

That is, if the result of the decision on selection between the manual scanning and the automatic scanning indicates the manual scanning, the process proceeds to the step S10 in FIG. 14, and in the case of the automatic scanning, the process proceeds to the step S5*a* in FIG. 17, thereby starting measurement of the laser beam scanning time by the rotatory mirror 8, respectively.

Subsequently, in the case of the automatic scanning, in the step S5*b*, the process waits until a scanning time length reaches a preset scanning time length up to a reading start position, and upon reaching the preset scanning time length, the process proceeds to the step S6 wherein the motor 7 is stopped through locking by the motor controller.

Steps of the process, taken thereafter, are the same as the steps S7 and onwards, as shown in FIGS. 14 and 15. However, if "measurement of the laser beam scanning time" as in the step S5*a* in FIG. 17 is started before the discrimination is made on auto/manual in the step S5 in FIG. 17, and the measurement is continued thereafter, "measurement of the laser beam scanning time" as in the step S10 in FIG. 14 can be omitted, so that in the case of the discrimination made in the step S5 being the manual scanning, the process can proceed to the step S11.

Other examples of the sensing indicator will be described hereinafter.

The sensing indicator of the rotatory mirror 8 is preferably installed radially in relation to the rotation center of the rotatory mirror 8 in order to enable the reflection type photosensor 25 to sense the rotation position of the rotatory mirror 8 as the rotatory optical deflector at the reading start position of the laser beam scanning range of the bar code, or at a spot corresponding to a position before the reading start position. However, this is not one of essential requirements.

Figure 18:
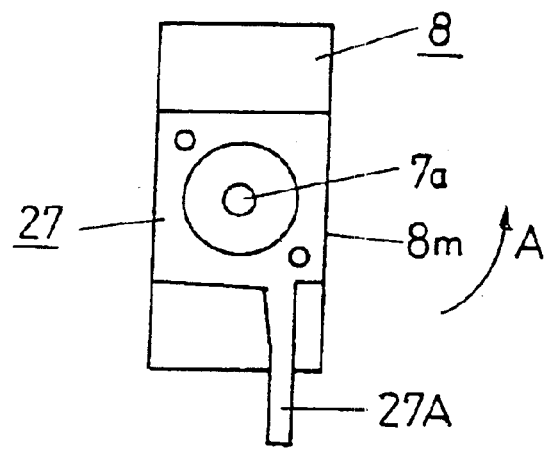
FIGS. 18 and 19 are views of a rotatory mirror as seen from the underside thereof, showing other different examples of sensing indicator, respectively.

For example, as shown in FIG. 18, a plate for detection 27 attached to the underside face of the rotatory mirror 8 may be provided with a strip 27A as a sensing indicator disposed so as to be in parallel with the reflection face 8*m* of the rotatory mirror 8 (rotatable in the direction of the arrow A), and to be protruded out of one of edge faces thereof.

Similarly, in the case of the coated stripe 30A shown in FIGS. 9 to 12, the coated stripe 30A may be formed on the underside face of the rotatory mirror 8 in such a way as to be in parallel with the reflection face 8*m* of the rotatory mirror 8.

Figure 19:
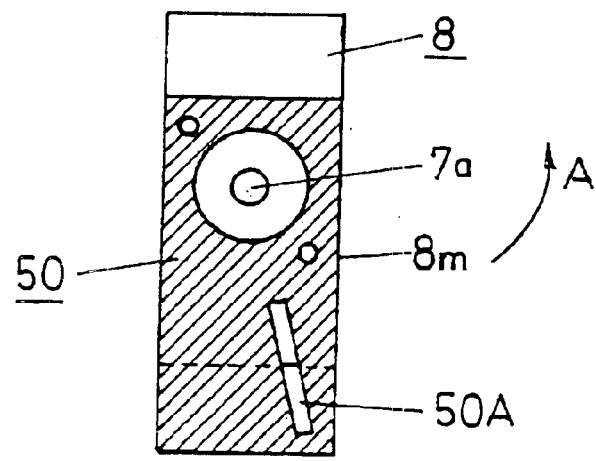

Further, for example, as shown in FIG. 19, a plate for detection 50 attached to the underside face of the rotatory mirror 8 may be provided with a slit 50A as a sensing indicator, formed radially in relation to the rotation center of the rotatory mirror 8. The plate for detection 50 is preferably formed of material having a high reflectance such as aluminum, or a face thereof opposite to the reflection type photosensor 25 is preferably painted in a color having a high reflectance such as a white color. Also, the plate for detection 50 may be provided with the slit 50A formed in such a way as to be in parallel with the reflection face 8*m* of the rotatory mirror 8.

In this case, reflected light comes to be sensed from a side edge of the plate for detection 50 by the reflection type photosensor 25 as a result of rotation of the rotatory mirror 8, and thereafter, a time when the reflected light is no longer sensed indicates sensing of the slit 50A. Processing of such a signal can be executed by the microcomputer through a software program.

Figure 20:
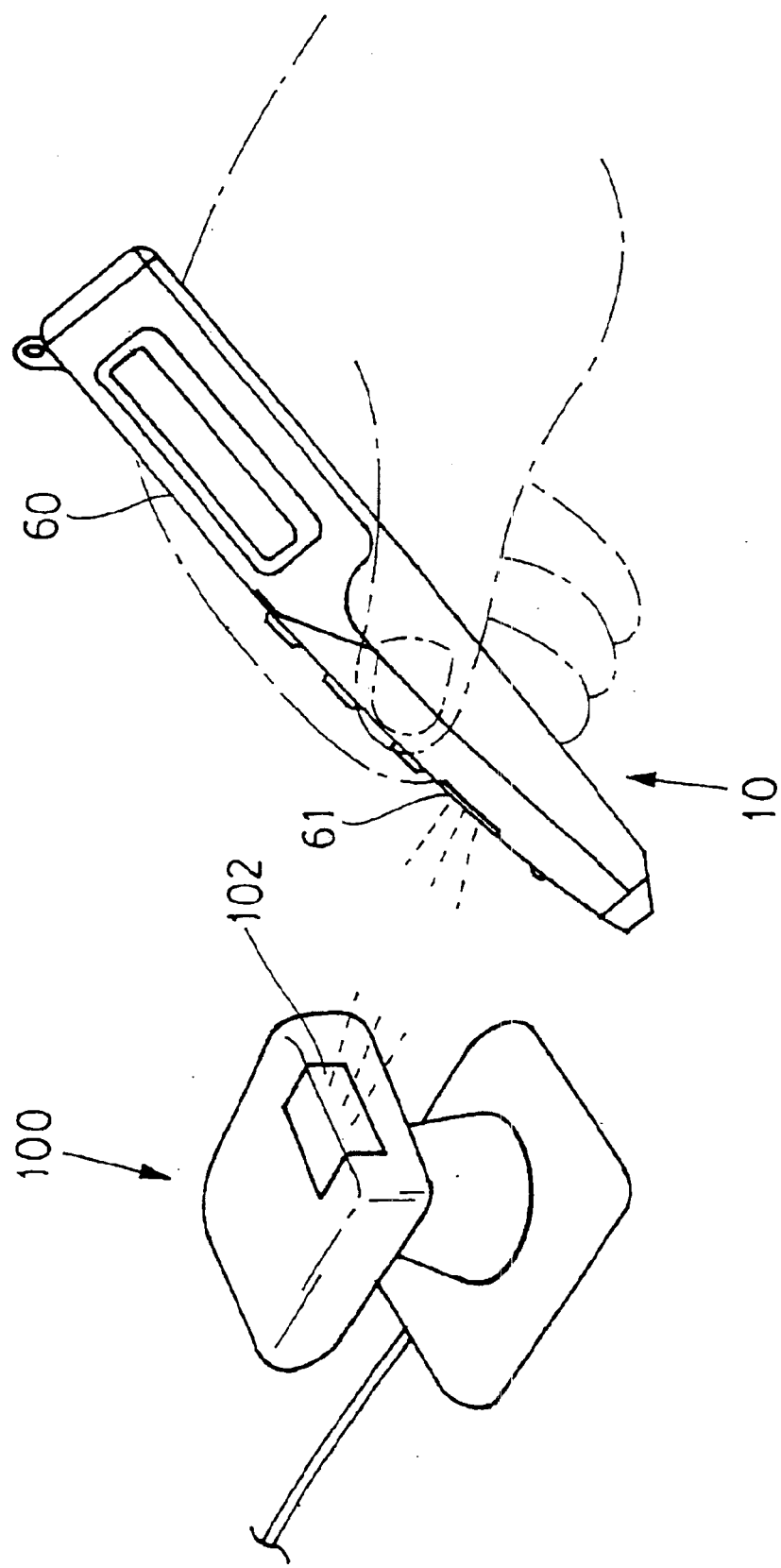
FIG. 20 is a perspective view showing the external appearance of a scanning head of a bar code reader according to the first embodiment as partially modified, and an application condition thereof.

Next, a bar code reader according to another embodiment representing a partial modification of the first embodiment described in the foregoing is described hereinafter. FIG. 20 is a perspective view showing the external appearance of a scanning head thereof, and an application condition thereof.

With the embodiment shown in FIGS. 1 and 2, the scanning head 10 of the bar code reader is connected with the decoder 46, and the decoder 46 with the host computer 40, by a signal line, respectively.

However, the recent trend has been to exchange data through infrared communication between computers, and between a computer and peripheral devices to an increasing extent, and accordingly, there has been an increase in use of equipment equipped with an infrared communication unit.

The standardized specification for infrared communication was created as IrDA specification in 1994, and has since been adopted formally for use in Windows 95 and 98.

As for an infrared communication unit installed by the side of a computer, there are two cases, one being a case where the infrared communication unit is assembled into the computer itself, and the other being a case where the infrared communication unit is provided as an adapter.

FIG. 20 shows an example wherein use is made of an adapter type infrared communication unit, and an infrared communication unit 100 is provided with an infrared ray transmit/receive port 102 disposed on the front face thereof.

On the other hand, a scanning head 10 of a bar code reader is provided with an infrared communication unit incorporated therein, and an infrared ray transmit/receive port 61 is installed on the upper face of a pen-type case 60 housing the scanning head 10, close to the tip thereof.

Holding the scanning head 10 in one hand as shown in the figure, the infrared ray transmit/receive port 61 is directed towards the infrared ray transmit/receive port 102 of the infrared communication unit 100 connected to a computer, and binarized data obtained by scanning a bar code are transmitted to the infrared ray transmit/receive port 102 through infrared communication, thereby transmitting the binarized data to the computer (including a decoder) via the infrared communication unit 100.

Figure 21:
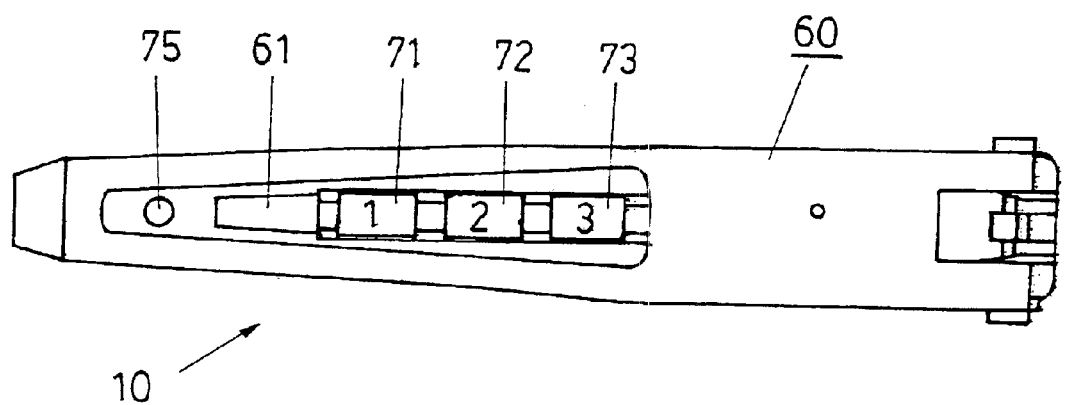
FIGS. 21 and 22 are a plan view and a side view, respectively, showing the external appearance of the scanning head.
Figure 22:
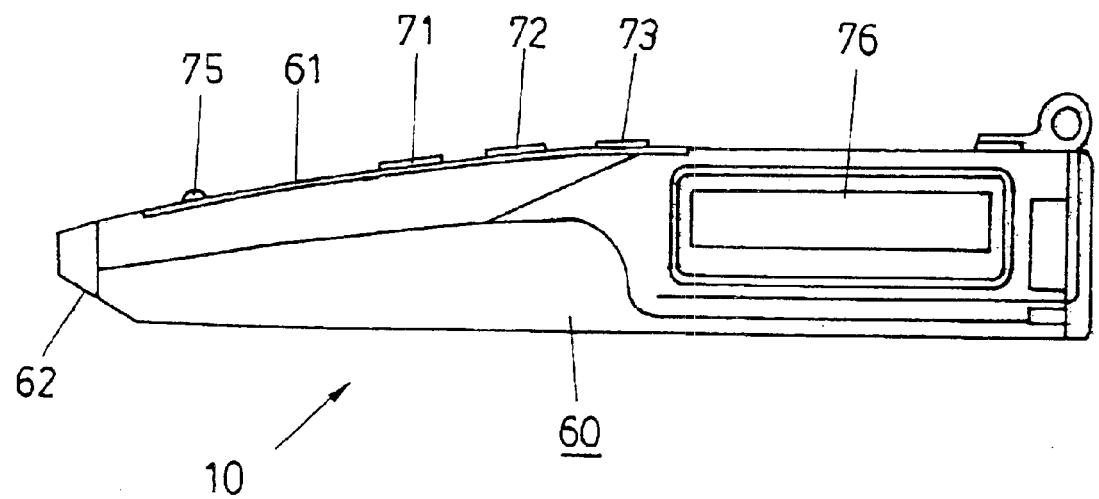

FIGS. 21 and 22 are a plan view and a side view, respectively, showing the external appearance of the scanning head 10 wherein the mechanism and the circuit substrates as shown in FIGS. 1 and 2 are housed inside the pen-type case 60, and a laser beam is applied from an opening of the tip 62 thereof, receiving reflected light back from the surface of the bar code.

Besides the infrared ray transmit/receive port 61, three keys (switches) of a first key 71, a second key 72, a third key 73 and an LED 75 for use in displaying are installed on the upper face of the case 60, and an LCD device 76 for displaying characters such as a menu, and so forth, is installed in the backward portion of a side face thereof.

The LED device 75 for use in displaying is lit up at times including a time of the bar code reading. Among the three keys, the first key 71 is a key for displaying and scrolling the description of a function menu on the LCD device 76, the second key 72 is a key for determining the description as displayed, and the third key 73 is a key for inputting numeric values for use in communication according to the previously-described IrDA as well as in menu-setting mode.

Selection between manual scanning and automatic scanning is executed by use of the first key 71 and the second key 72. More specifically, by pressing the first key 71, display of the function menu is scrolled, thereby causing a menu screen "read" to appear. Then, upon pressing the second key 72, read mode is entered, whereupon display "manual" appears, and if manual scanning is to be selected, "manual scanning" mode is entered by pressing the second key 72 again to determine such a selection.

Meanwhile, upon pressing the first key 71 when display is in "manual" state, the display is turned into "auto", whereupon "auto scanning" mode is entered by pressing the second key 72 to determine such a selection.

Figure 23:
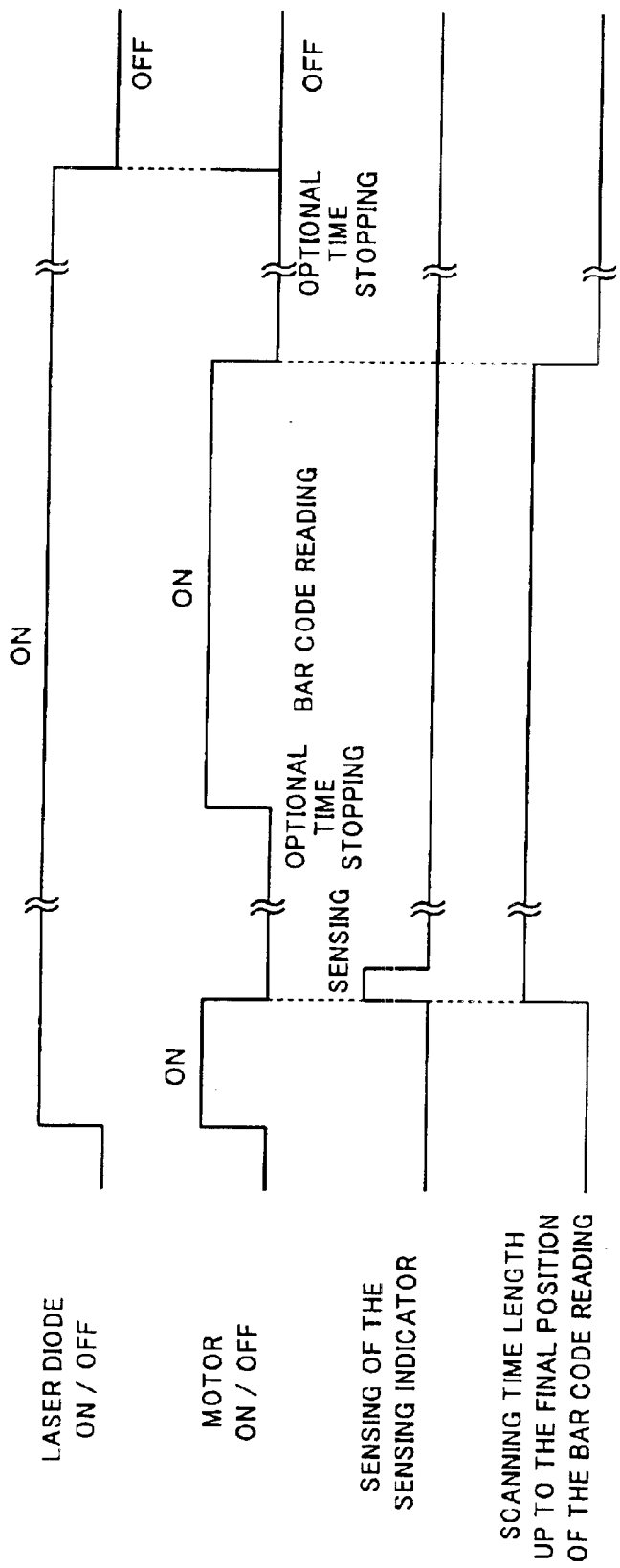
FIG. 23 is a basic timing chart showing relationship among ON/OFF of a laser diode and a motor, sensing of the sensing indicator, and a scanning time length, with reference to the bar code reader according to the invention.
Figure 24:
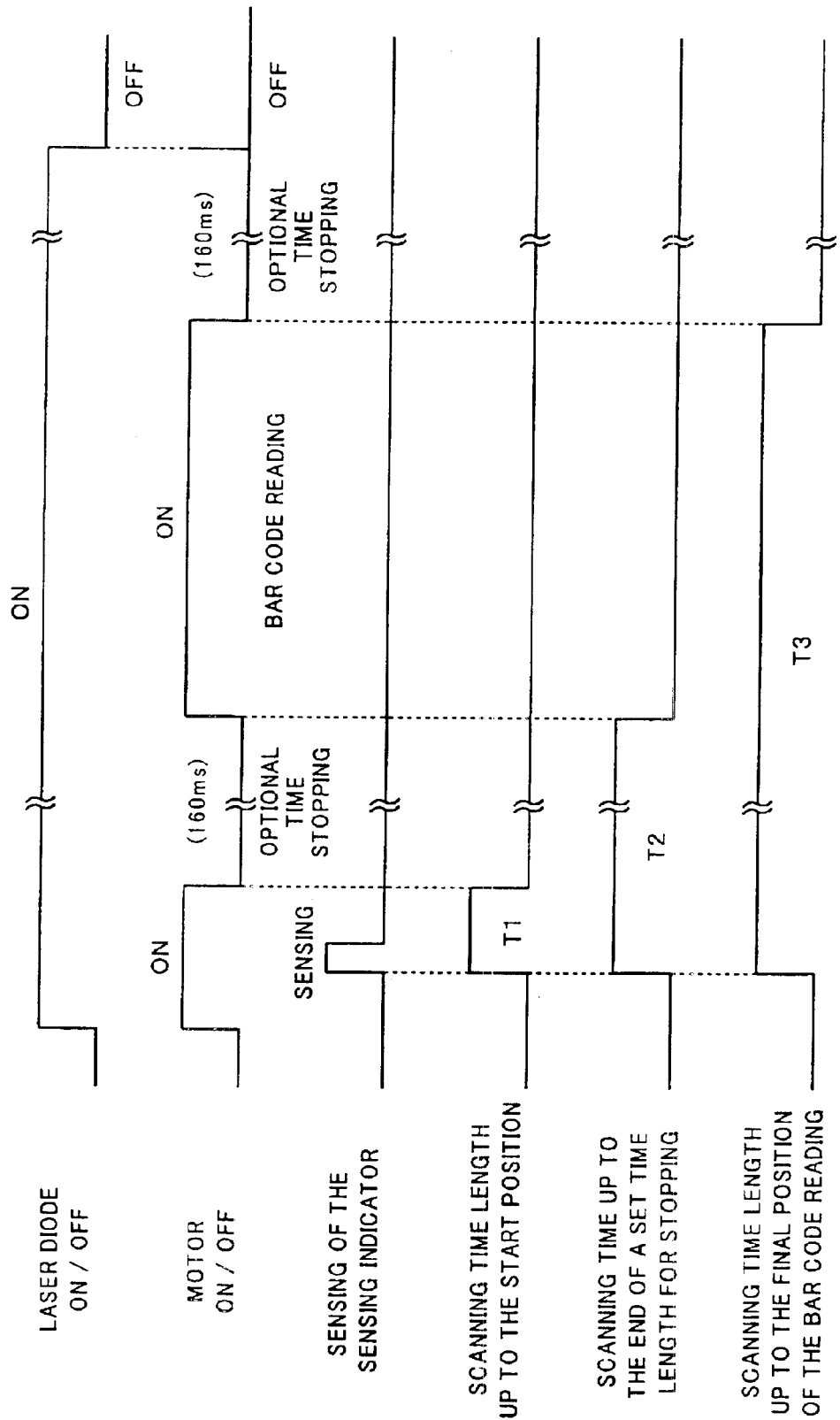
FIG. 24 is a timing chart similar to FIG. 23, showing a case of variably setting various scanning time lengths.

Herein, with respect to the bar code reader according to this embodiment of the invention, relationship among ON/OFF of the laser diode and the motor, sensing of the sensing indicator, and scanning time is described by referring to a timing chart shown in FIGS. 23 and 24, respectively.

FIG. 23 indicates basic operation timing. The laser diode and the motor of the rotatory mirror are turned ON, the motor is turned OFF and locked for an optional time length upon sensing of the sensing indicator, thereby stopping scanning by a laser beam, and, subsequently, the bar code reading is started by turning the motor ON. Upon reaching a scanning time length up to the final position of the bar code reading, the motor is stopped for an optional time length by turning the motor OFF and locking the same, and during a period of the optional time length, completion of the bar code reading is determined. If the bar code reading is found completed, an operation is completed by turning OFF the laser diode as well.

If the bar code reading is found uncompleted, the laser diode and the motor of the rotatory mirror are turned ON again, thereby repeating the operation as described above.

The optional time length for stopping the motor as referred to in FIG. 23 is to be preset so as to be long enough to enable the laser beam to be visually recognized, for example, on the order of 160 ms.

FIG. 24 shows by way of example a case of optionally setting a scanning time length T1 up to a start position of the bar code reading by the laser beam after sensing of the sensing indicator, a scanning time length T2 up to the end of a set time length for stopping the motor, and a scanning time length T3 up to the final position of the bar code reading. That is, an example of timing setting in the case where a width of the bar code reading is varied.

For example, the scanning time length T1 up to the start position of the bar code reading is set by scrolling display of the function menu by use of the first key 71 as shown in FIGS. 21 and 22, and determined with the second key 72 after inputting a numeric value (in unit of $\mu$SEC) with the third key 73 while keeping "T1" display state.

Setting of the optional time length for stopping the motor is implemented by setting "T2−T1". That is, display of the function menu is scrolled with the first key 71 shown in FIGS. 21 and 22, and the setting is determined with the second key 72 after inputting a numeric value (in unit of $\mu$SEC) with the third key 73 while keeping "T2−T1" display state.

Setting of a scanning time length for the bar code reading is implemented by setting "T3−T2". For example, when the width of the bar code reading is at the minimum, display of the function menu is scrolled with the first key 71 shown in FIGS. 21 and 22, and the setting is determined with the second key 72 while keeping "T3−T2=400 $\mu$SEC" display state as shown in FIG. 25.

Meanwhile, when the width of the bar code reading is at the maximum, display of the function menu is scrolled with the first key 71, and the setting is determined with the second key 72 while keeping "T3−T2=1 mSEC" display state as shown in FIG. 26.

Or when setting a scanning time length corresponding to an optional width of the bar code reading, display of the function menu is scrolled with the first key 71, and the setting is determined with the second key 72 after inputting an optional numeric value (in unit of $\mu$SEC) with the third key 73 while keeping "T3−T2=____$\mu$SEC" (in this example, 525 $\mu$SEC) display state as shown in FIG. 27.

These scanning time lengths described above varies depending on a revolution speed of the motor 7, and in the case of this embodiment, the revolution speed of the motor 7 is 5000 rpm.

The scanning time length T1 up to the start position of the bar code reading in FIG. 24 may be 0, and FIG. 23 shows the timing chart in the case of T1=0.

Now, in the case of the automatic scanning, if a rotation speed of the rotatory optical deflector is reduced only during a period when the laser beam is scanning the bar code surface so as to slow down a scanning speed of the laser beam, this will enable the scanning position and the width of the laser beam to be recognized with greater ease, and also the scanning position to be corrected with ease, so that the bar code reading can be executed with greater reliability and more efficiently. Furthermore, by causing the rotatory optical deflector to be rotated at a high speed when it is rotated outside of the laser beam scanning range of the bar code, a reading time in whole can be rather reduced in this case.

As described hereinbefore, with the first embodiment of the bar code reader according to the invention, since rotation of the rotatory optical deflector is stopped at the opposite edges of the laser beam scanning range of the bar code for only the predetermined time length, scanning by the laser beam as well is stopped, so that the laser beam can be recognized with ease, and the scanning position can be corrected by checking the scanning position and the width of the laser beam on the bar code surface.

Further, in the case where either the automatic scanning or the manual scanning is rendered selectable, because at a time of the automatic scanning, rotation of the rotatory optical deflector is stopped at the opposite edges of the laser beam scanning range of the bar code for only the predetermined time length as described above while at a time of the manual scanning, the rotatory optical deflector is locked and stopped at the central position of the laser beam scanning range of the bar code, the laser beam is rendered stationary as well, so that it is possible to manually scan the bar code while visually recognizing the laser beam. Accordingly, in either case, the bar code reading can be executed with reliability and efficiency.

Still further, since it is sufficient for achieving the object of the invention to install the sensing indicator for detecting the rotation position of the rotatory optical deflector at just one spot, the bar code reader can be provided at a low cost. In addition, because the scanning time length up to the final position of the bar code reading can be suitably set according to the width of the bar code, it is possible to read the bar code having any width with reliability and efficiency by implementing accurate focusing of the laser beam.

Second Embodiment: FIGS. 28 to 32

Next, a second embodiment of a bar code reader according to the invention is described with reference to FIGS. 28 to 32.

Figure 28:
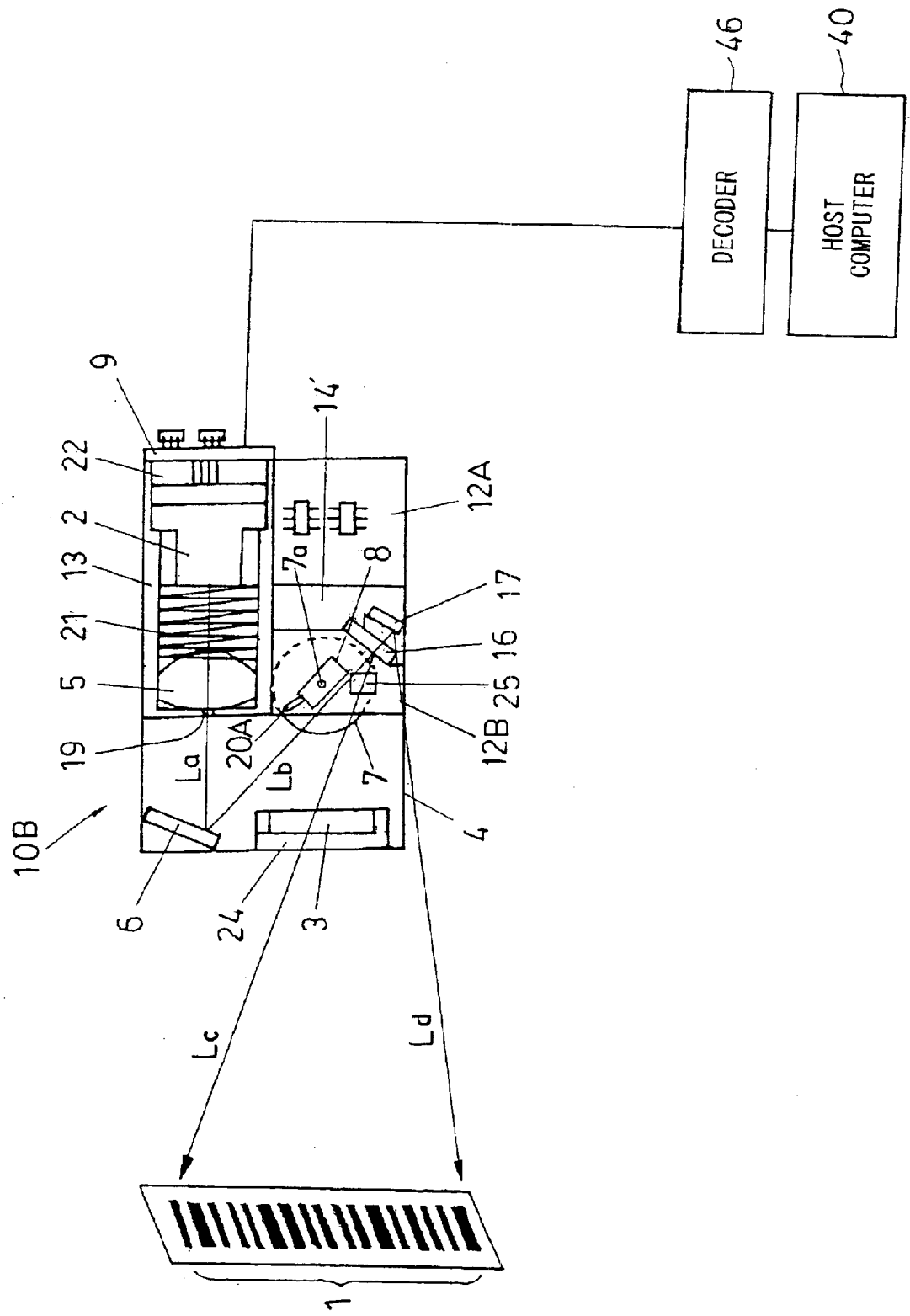
FIG. 28 is a schematic plan view of a second embodiment of a bar code reader according to the invention, showing a state of bar code reading.
Figure 30:
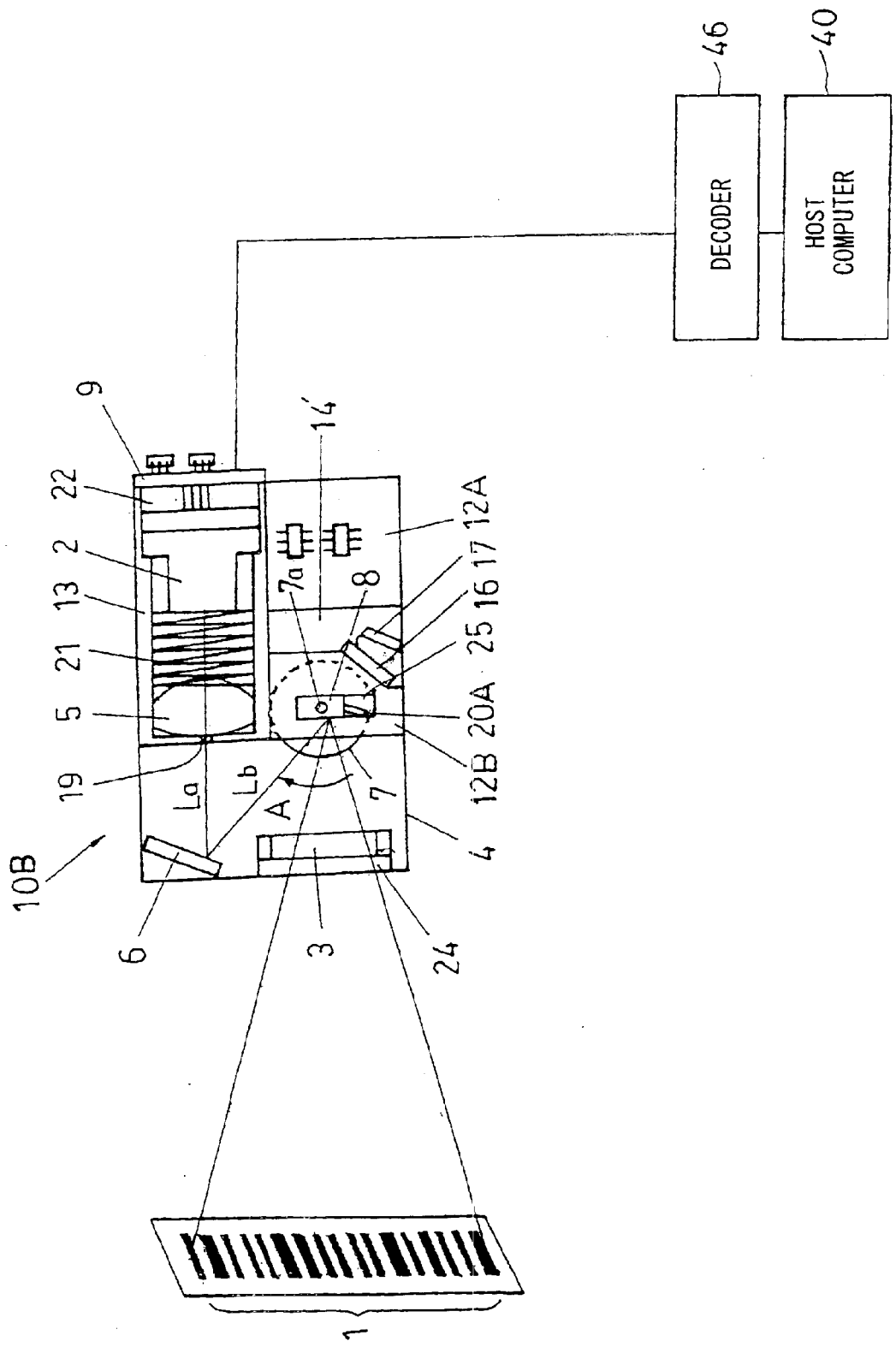
FIG. 30 is a schematic plan view thereof similar to FIG. 28, showing a state of application of a laser beam when a rotatory mirror is in a rotation position outside the optical path of the laser beam.

FIGS. 28 and 29 are a schematic plan view of the second embodiment of the bar code reader according to the invention, showing a state of bar code reading, and a perspective view thereof, showing the constitution thereof in more details, corresponding to FIGS. 1 and 2 for the previously-described first embodiment, respectively. FIG. 30 is a schematic plan view thereof, similar to FIG. 1, showing a state where rotation of a rotatory mirror 8 is temporarily stopped.

In these figures, parts corresponding to those in FIGS. 1 and 2 are denoted by the like reference numerals, and description thereof is omitted.

A scanning head 10B of the bar code reader differs in construction from the scanning head 10 of the previously-described first embodiment only in that fixed onto a retaining member 4 with a setscrew (not shown), respectively, are a mirror 6 which is a first fixed optical deflector, a motor 7 with a rotation shaft 7a thereof to which a rotatory mirror 8 which is a rotatory optical deflector for scanning is fixedly attached, scanning control substrates 12A, 12B including a motor control circuit for the motor 7, and a mirror 15 which is a second fixed optical deflector supported by a mirror support member 14 in a block shape and disposed behind the motor 7.

An electric signal processing substrate 11 is a substrate on which respective units for driving a photodetedtor 3, and also for processing electric signals outputted by the photo-receptor device 3 are provided, comprising a photoelectric conversion unit 31, an amplifier 32, a peak value hold unit 33, a comparator 34, and a binarization unit 35, as shown in FIG. 3.

With this embodiment, two sheets of the scanning control substrates, 12A, 12B are provided, however, a construction of the embodiment may be modified such that only one sheet of a scanning control substrate is provided, and the mirror support member 14 is disposed thereon.

With the scanning head 10B as well, laser light emitted by a laser diode 2 is rendered into parallel light rays through a collimator lens 5, and a laser beam La in a thin beam form is sent out from an aperture 19 provided on the front end face of a light emitting box 13. Then, the laser beam La is deflected by the mirror 6 which is the first fixed optical deflector, and a laser beam Lb as deflected is deflected by the rotatory mirror 8 which is the rotatory optical deflector for scanning so as to be applied towards a bar code surface 1, thereby scanning the bar code surface 1 from the lower edge thereof to the upper edge thereof shown in FIG. 28 by rotation of the rotatory mirror 8, in the direction of the arrow A.

At this point in time, reflected light from the bar code surface 1 is received by the photodetector 3, for example, a photodiode or the like, and is converted into an electric signal which varies depending on an intensity of the reflected light.

Data obtained through binarization of the electric signal are sent out to a decoder 46 for decoding the data into numerals, signs, and so forth, and decoded data are inputted to a host computer 40.

As is evident from FIG. 29, because the rotatory mirror 8 is in the shape of a cuboid, and at least a side face thereof, along the longitudinal direction, is rendered specular by means of vapor deposition of aluminum, the laser beam Lb traveling from the mirror 6 undergoes deflection when it is applied to the side face and is reflected thereby, and by causing the rotatory mirror 8 to be rotated by the motor 7, a laser beam as reflected scans the bar code surface 1 while shining the same.

Further, as shown in FIG. 30, when the rotatory mirror 8 is situated in a rotation position outside the optical path of the laser beam Lb as deflected by the mirror 6 (that is, in a rotation position where the side face thereof is substantially parallel with the optical path of the laser beam Lb), the laser beam Lb as deflected by the mirror 6 will not be applied to the rotatory mirror 8, but applied to the mirror 15 which is a fixed optical deflector disposed on an opposite side from the mirror 6 with respect to the rotatory mirror 8, thereby being deflected in a given direction by the mirror 15.

Consequently, when the rotatory mirror 8 is situated in the rotation position outside the optical path of the laser beam Lb, a laser beam Lc reflected by the mirror 15 is applied in a given direction all the time.

Accordingly, it is easy to recognize the laser beam Lc, thereby facilitating the scanning head 10B to be sight on an optimum readable position on the bar code face 1. In the case of a rotation speed (scanning speed) of the rotation mirror 8 being fast, it is rendered still easier to recognize the laser beam Lc if the rotation mirror 8 is set to stop for a predetermined time length when the rotation mirror 8 comes into the rotation position outside the optical path of the laser beam Lb as shown in FIG. 30.

With this embodiment as well, a strip 20A and a reflection type photosensor 25, making up a rotation position detection means of the rotatory mirror 8, are provided. These parts are the same as those for the first embodiment described with reference to FIGS. 4 to 8, and the modified examples as shown in FIGS. 9 to 12, and in FIGS. 18 and 19, respectively, are applicable.

Provided, however, that the reflection type photosensor 25 is disposed on the scanning control substrate 12B and below a passing position of the strip 20A, thereby enabling the strip 20A to be sensed by the reflection type photosensor 25 when a rotation position of the rotatory mirror 8 is at the home position (standby position) as shown in FIGS. 28 and 29.

The scanning control substrate 12A includes a circuit for making decision on the rotation position of the rotatory mirror 8 where rotation thereof is caused to temporarily stop, by measuring time elapsed from sensing of passage of the strip 20A by the reflection type photosensor 25, on timing for starting the bar code reading, and so forth, as well as a circuit for controlling operation of the motor 7 according to the decision made.

Furthermore, any of the scanning control substrates 12A, 12B, a laser diode control substrate 9, and the electric signal processing substrate 11 is equipped with a microcomputer for executing overall control of respective units of the scanning head 10B.

Figure 31:
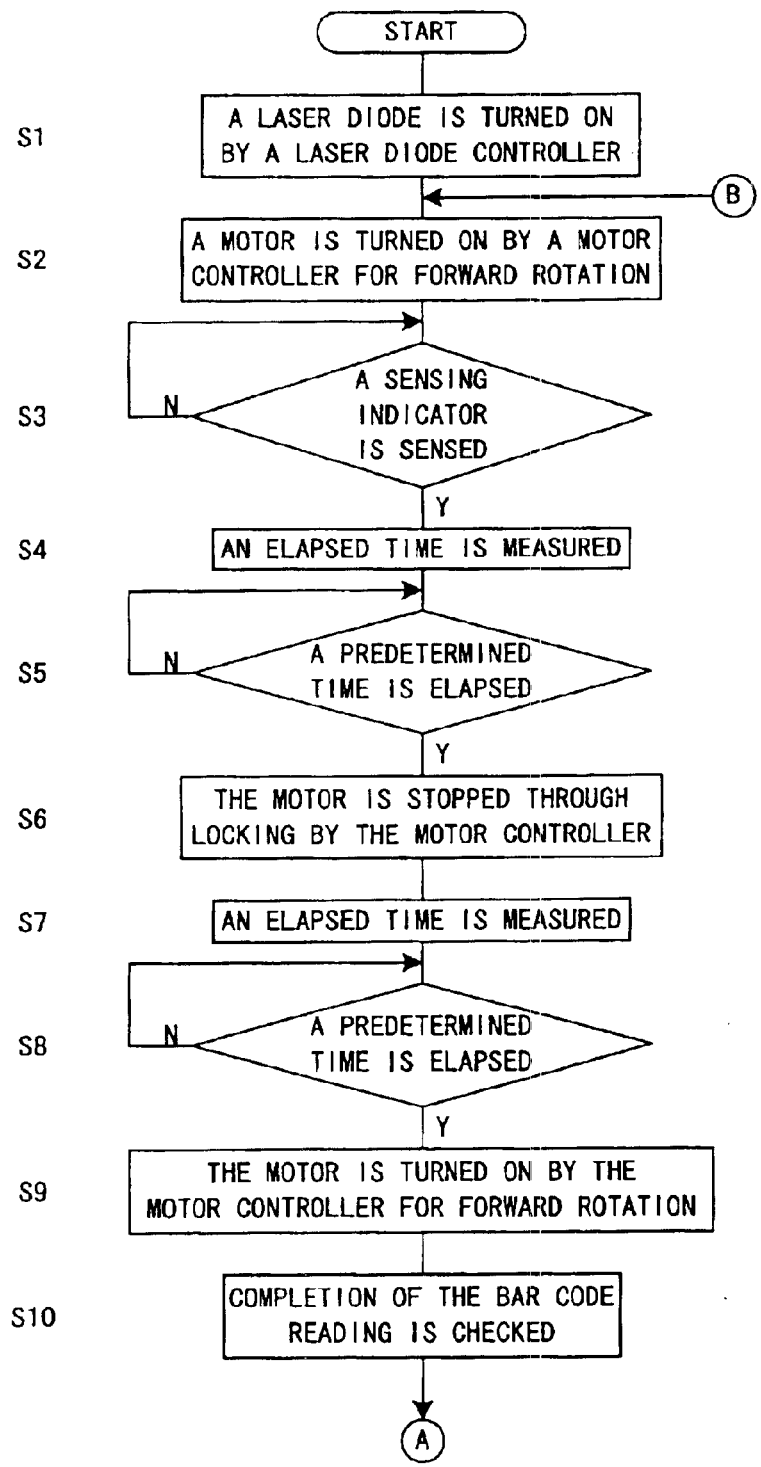
FIGS. 31 and 32 are flow charts showing a control process flow of the scanning head of the bar code reader shown in FIGS. 28 to 30.
Figure 32:
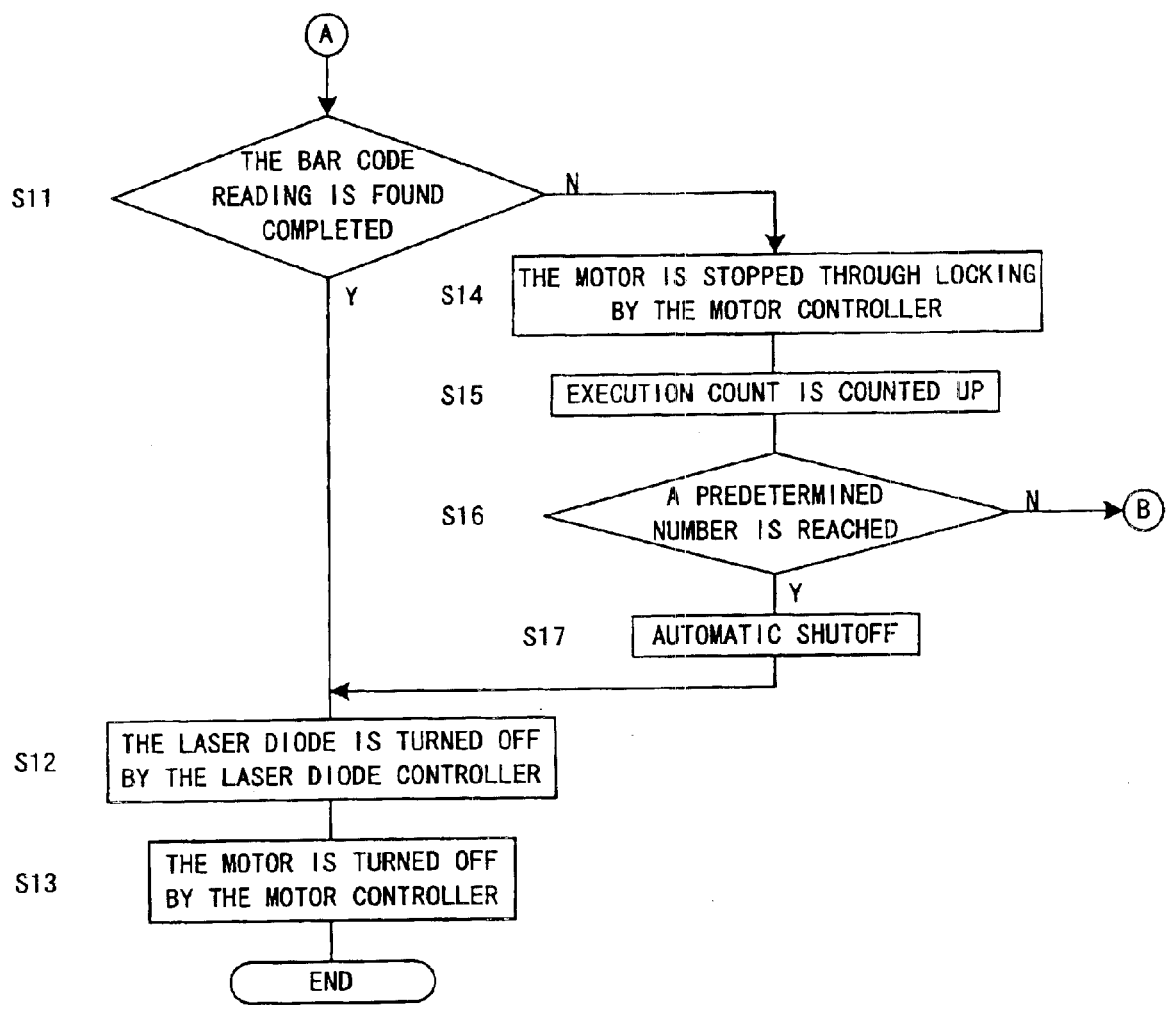

Next, a control process of the scanning head 10B of he bar code reader will be described hereinafter by referring to a flow chart shown in FIGS. 31 and 32, respectively. FIGS. 31 and 32 show one continuous flow chart, however, for convenience in illustration, it is divided into two flow charts in two figures.

Control shown in these flow charts is executed by a command from the microcomputer for executing overall control of the respective units of the scanning head 10B shown in FIGS. 28 to 30. The microcomputer is installed on any of the substrates 9, 11, 12A and 12B.

When start of bar code reading is instructed with the flick of a switch (not shown) or the like, this process is started.

First, in a step S1 in FIG. 31, the laser diode 2 is turned ON (caused to emit light) by a laser diode controller. Subsequently, in a step S2, the motor 7 is turned ON by a motor controller to be driven for forward rotation.

In a step S3, the process waits for the reflection type photosensor 25 to sense the sensing indicator (the strip 20A), and upon sensing the sensing indicator, a timer inside the motor controller is activated to start measurement of an elapsed time in a step S4.

Then, in a step S5, the process waits for the elapse of a predetermined time length, and upon the elapse of the predetermined time length, proceeds to a step S6 wherein the motor 7 is stopped through locking by the motor controller.

It is meant by "stopped through locking" herein that in the case of using a "DC motor with brushes/coreless" for the motor, a voltage to drive the motor for reverse rotation is applied to the motor through control of the motor controller so as to apply brake thereto, and thereafter, the voltage is cut off, thereby turning OFF the motor. In this case, even if the motor 7 is turned OFF, the rotatory mirror 8 will not be moved with a small load applied thereto due to holding power of brushes. In the case of using a stepping motor capable of high speed control, that the motor is locked by causing holding current to flow therethrough.

The predetermined time length in the step S5 is set to a time length required for rotation of the rotatory mirror 8 from the home position shown in FIG. 28 (position where the strip 20A as the sensing indicator is sensed by the reflection type photosensor 25) to the rotation position where the rotatory mirror 8 is situated outside the optical path of the laser beam Lb as shown in FIG. 30 (the rotation position where a mirror-like face of the rotation mirror 8 is substantially parallel with the optical path of the laser beam Lb). Accordingly, the predetermined time length varies depending on a rotation speed of the rotatory mirror 8.

Subsequently, in a step S7, the timer inside the motor controller is reset to start measurement of an elapsed time again. In a step S8, the process waits for the elapse of a predetermined time length, and upon the elapse of the predetermined time length, proceeds to a step S9, wherein the motor 7 is turned ON by the motor controller to be driven for forward rotation. In other words, the bar code reading is started.

The predetermined time length referred to in the step S8 is set to a time length required for adjusting a position and an angle of the scanning head 10B such that, when rotation of the rotatory mirror 8 is stopped, and a user holding the scanning head 10B recognizes that the laser beam Lb deflected by the mirror 6 is further deflected by the mirror 15, and is applied in the given direction as shown in FIG. 30, and the user is able to cause the laser beam to be applied to the bar code surface as the target for reading.

Thereafter, in a step S10, whether or not the bar code reading is completed is checked within a given time length, and if the bar code reading is found completed in a step S11 shown in FIG. 32, the process proceeds to a step S12, wherein the laser diode 2 is turned OFF by the laser diode controller. Subsequently, in a step S13, the motor 7 is turned OFF by the motor controller to stop rotation of the rotatory mirror 8, thereby completing the process.

On the other hand, if the bar code reading is found uncompleted in the step S11, the process proceeds to a step S14, wherein the motor 7 is locked by the motor controller to thereby stop rotation of the rotatory mirror 8, and in a step S15, an execution count is counted up.

In a step S16, the number of the execution count is checked, and if a predetermined number of the execution count as preset is not reached as yet, the process reverts to the step S2 in FIG. 31, repeating the process according to the steps S2 and onwards.

If the predetermined number is found reached in the step S16, an automatic shutoff processing is executed in a step S17, and the process proceeds to the steps S12 and S13 wherein the laser diode 2 and the motor 7 are turned OFF, respectively, thereby completing the process.

With this embodiment, before the bar code reading is started, the rotatory mirror 8 is stopped at the rotation position thereof where the laser beam Lb is not received by the rotatory mirror 8 as shown in FIG. 30, for the predetermined time length, so that the laser beam Lb being applied to the mirror 15 which is the second fixed optical deflector is reflected thereby, and maintains application in the given direction. Consequently, since the user can recognize the laser beam Lc with ease, the user is able to easily adjust the position and the angle of the scanning head 10B such that the laser beam Lc can be applied to the bar code surface as the target for reading. Thus, a bar code reading ratio can be considerably enhanced.

Further, the mirror 15 is disposed on the opposite side from the mirror 6 with respect to the rotatory mirror 8, an increase in the size of the scanning head 10B can be avoided.

Needless to say, it is possible to house the scanning head 10B according to the second embodiment as well in a pen-type case, and to transmit binarized data obtained by scanning the bar code to a computer through infrared communication as shown in FIGS. 20 to 22.

Figure 33:
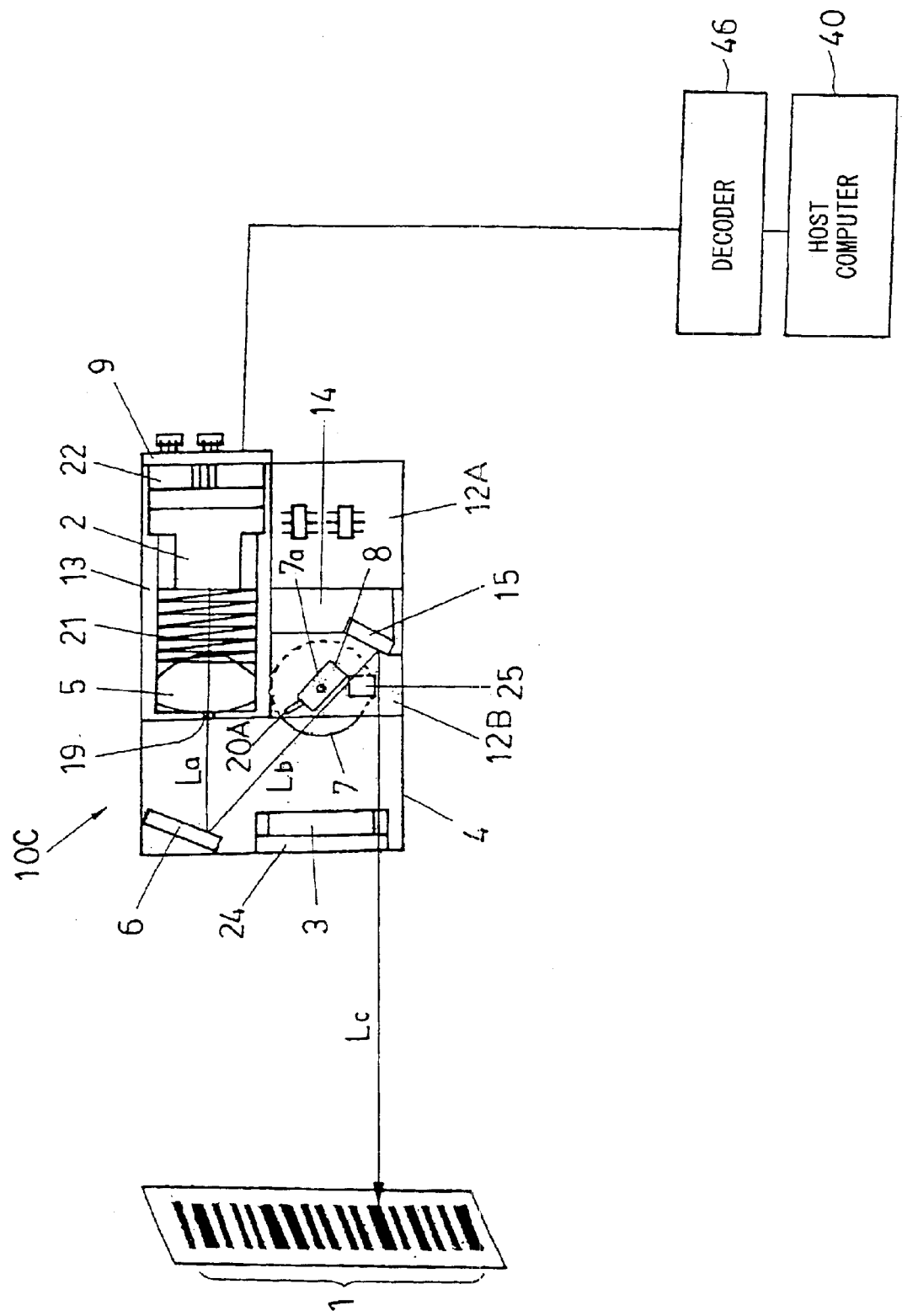
FIG. 33 is a schematic plan view of a third embodiment of a bar code reader according to the invention, showing a state of bar code reading.
Figure 34:
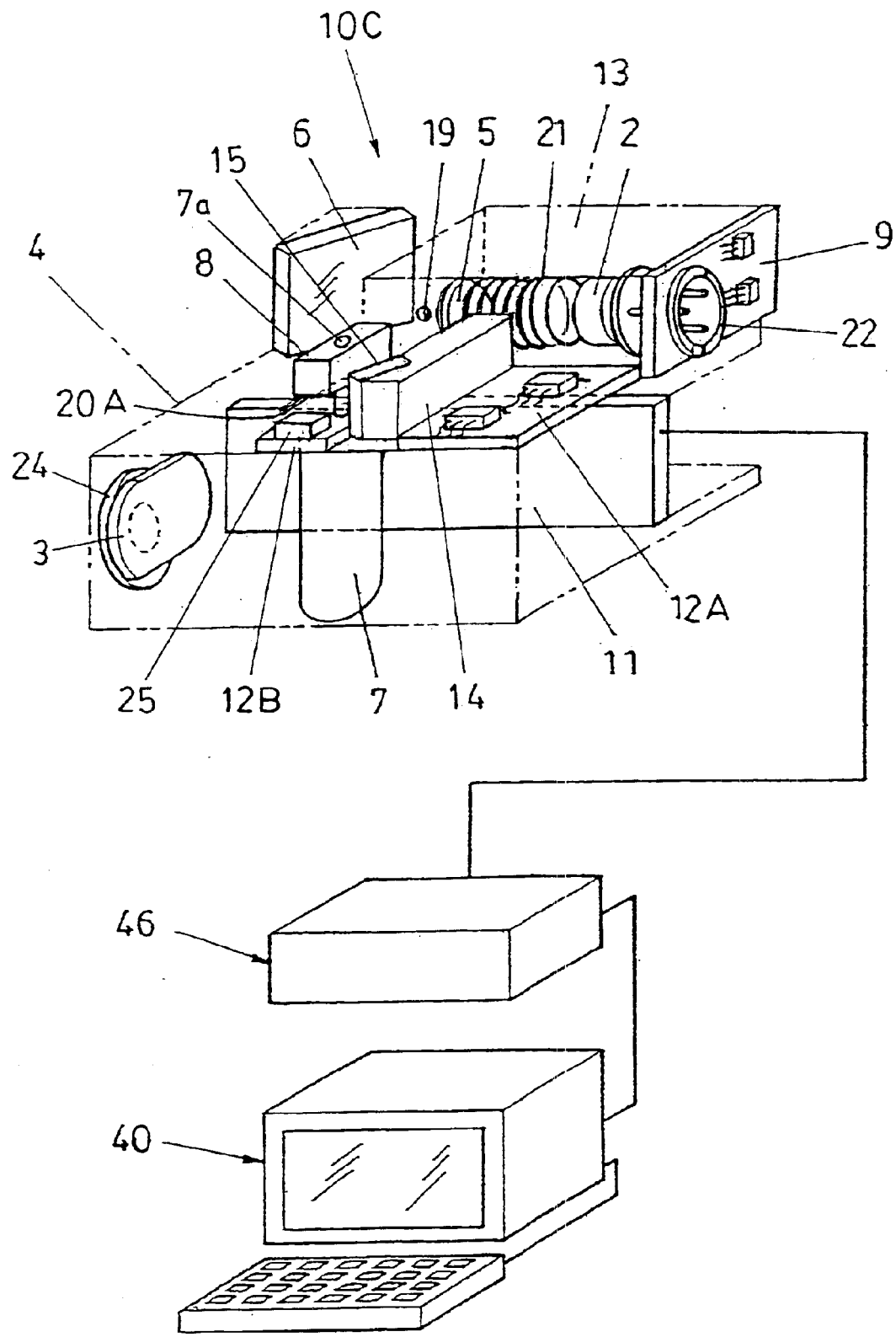
FIG. 34 is a perspective view thereof, showing the constitution of a scanning head thereof in more details.
Figure 35:
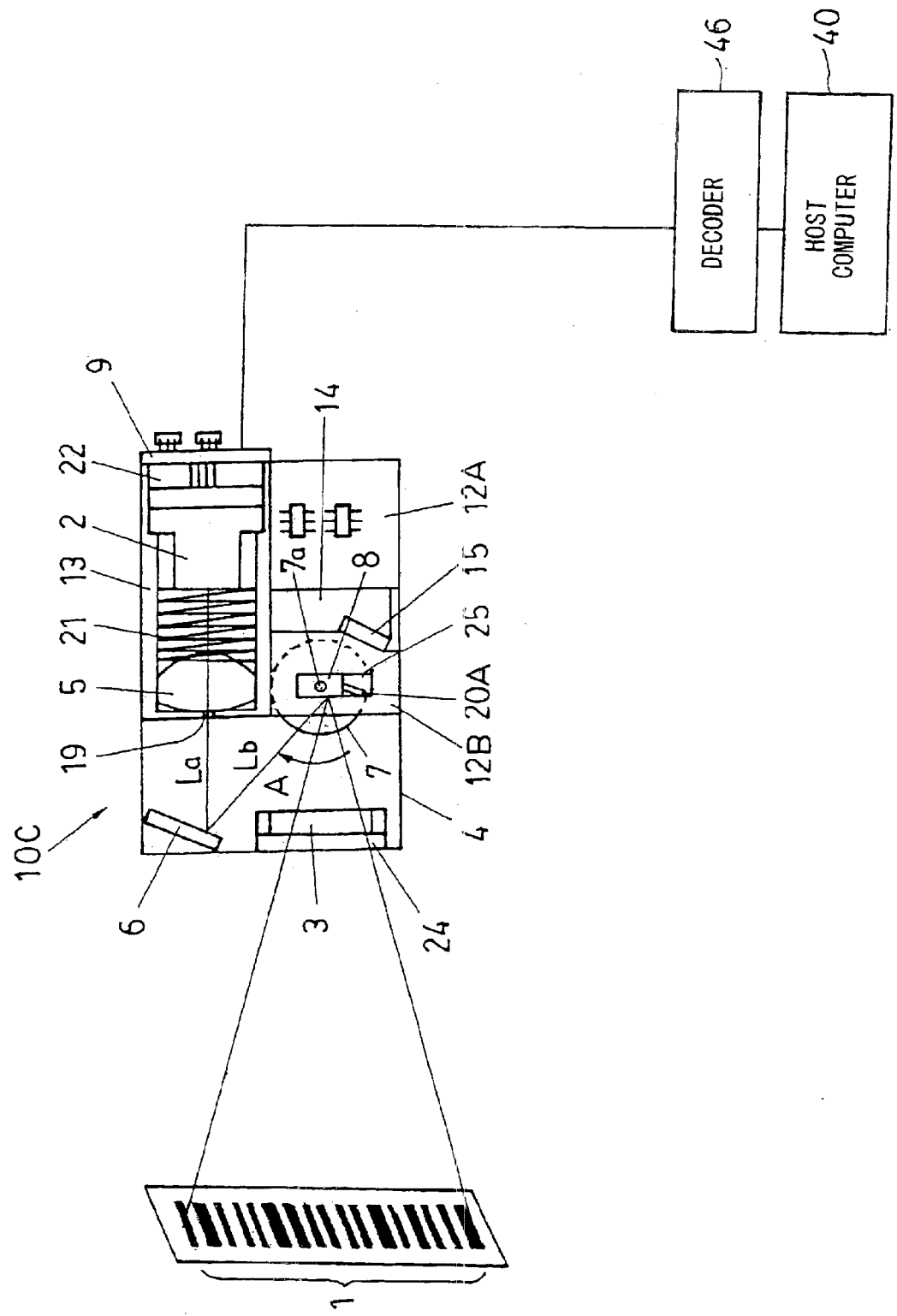
FIG. 35 is a schematic plan view thereof similar to FIG. 33, showing a state of application of a laser beam when a rotatory mirror is in a rotation position outside the optical path of the laser beam.

Third Embodiment: FIGS. 33 to 35

Next, a third embodiment of a bar code reader according to the invention is described with reference to FIGS. 33 to 35.

FIGS. 33, 34 and 35 are figures corresponding respectively to FIGS. 28, 29 and 30 showing the previously-described second embodiment. In these figures, parts corresponding to those in FIGS. 28, 29 and 30 are denoted by the like reference numerals, and description thereof is omitted.

As shown in FIGS. 33 and 34, a scanning head 10C of the bar code reader according to the third embodiment is provided with a translucent mirror 16 which is a translucent reflector, disposed so as to be supported by a mirror support member 14', as a second fixed optical deflector in place of the previously-described mirror 15, and is further provided with a mirror 17 as a third fixed optical deflector, disposed behind the translucent mirror 16.

The translucent mirror 16 reflects a portion of an incoming laser beam to be deflected in a given direction, and allows the rest of the incoming laser beam to be transmitted therethrough.

Accordingly, when a mirror 8 is situated in a rotation position outside the optical path of a laser beam Lb deflected by a fixed mirror 6 as shown in FIG. 35, the laser beam Lb falls on the translucent mirror 16, and a portion of the laser beam Lb is reflected to be deflected in a given direction, thereby being applied as shown by a laser beam Lc in the figure. The rest of the laser beam Lb is transmitted through the translucent mirror 16, and falls on the mirror 17 disposed behind the translucent mirror 16 to be deflected in a direction differing from the given direction described above, thereby being applied as shown by a laser beam Ld in the figure.

Accordingly, if rotation of the rotatory mirror 8 is stopped at a rotation position thereof, where the mirror 8 is substantially parallel with the optical path of the laser beam Lb as shown in FIG. 35 for only a predetermined length of time, it is possible to recognize the laser beam Lc and the laser beam Ld with ease, so that bar code reading can be executed with reliability by adjusting a position and an angle of the scanning head 10C such that two spots of these laser beams can be applied to a bar code surface 1 as the target for reading, at a suitable interval in the direction of reading.

By setting respective application directions of the laser beams Lc and Ld so as to approximate to respective directions of the opposite edges of a scanning range of bar code reading by rotation of the rotatory mirror 8, it becomes possible to adjust the position of the scanning head 10C while checking a width of the bar code reading by referring to the two spots by the laser beams Lc, and Ld, thereby rendering focusing of the laser beams extremely easier.

In order to enhance reflectance over a range of specified wavelengths, a thin film made up of a single layer or multilayers is preferably formed through vapor deposition on a reflection face of the rotatory mirror 8 and the fixed mirrors 6, 15 and 17 used in carrying out the second and third embodiments. For the fixed translucent mirror 16, use is made of a glass or plastic sheet with a thin metal film or a dielectric multilayer film, having such thickness as is capable of reflecting a portion of incoming light while allowing the rest to be transmitted therethrough, formed through vapor deposition on the surface thereof.

Further, the rotatory mirror 8 is not limited to a mirror rotatable only in a given direction, and a mirror such as a galvanomirror, capable of rotatively reciprocating over a range within a predetermined angle, may be used instead.

Still further, with the respective embodiments described hereinbefore, the rotation position of the rotatory mirror 8 is sensed when the rotatory mirror 8 is at the home position, however, if setting is modified such that the rotatory mirror 8 is directly sensed when the rotatory mirror 8 is situated in the rotation position outside the optical path of the laser beam Lb as shown in FIG. 30 or 35, the motor 7 can be turned OFF immediately upon such sensing to stop the mirror 8.

Needless to say, it is possible to house the scanning head 10C according to the third embodiment as well in a pen-type case, and to transmit binarized data obtained by scanning the bar code to a computer through infrared communication as shown in FIGS. 20 to 22.

With the bar code reader according to the second and third embodiments, respectively, it is also possible to easily recognize a position of application by the laser beam, on the bar code surface, prior to the start of scanning without needs for increasing a size of the scanning head even if a scanning speed of the laser beam is increased. Consequently, it is possible to adjust the scanning head with ease so as to be at an optimum readable position and angle in relation to the bar code surface, so that the bar code reading can be executed accurately and efficiently.

Fourth Embodiment: FIGS. 36 to 45

Next, a fourth embodiment of a bar code reader according to the invention is described with reference to FIGS. 36 to 45.

Figure 36:
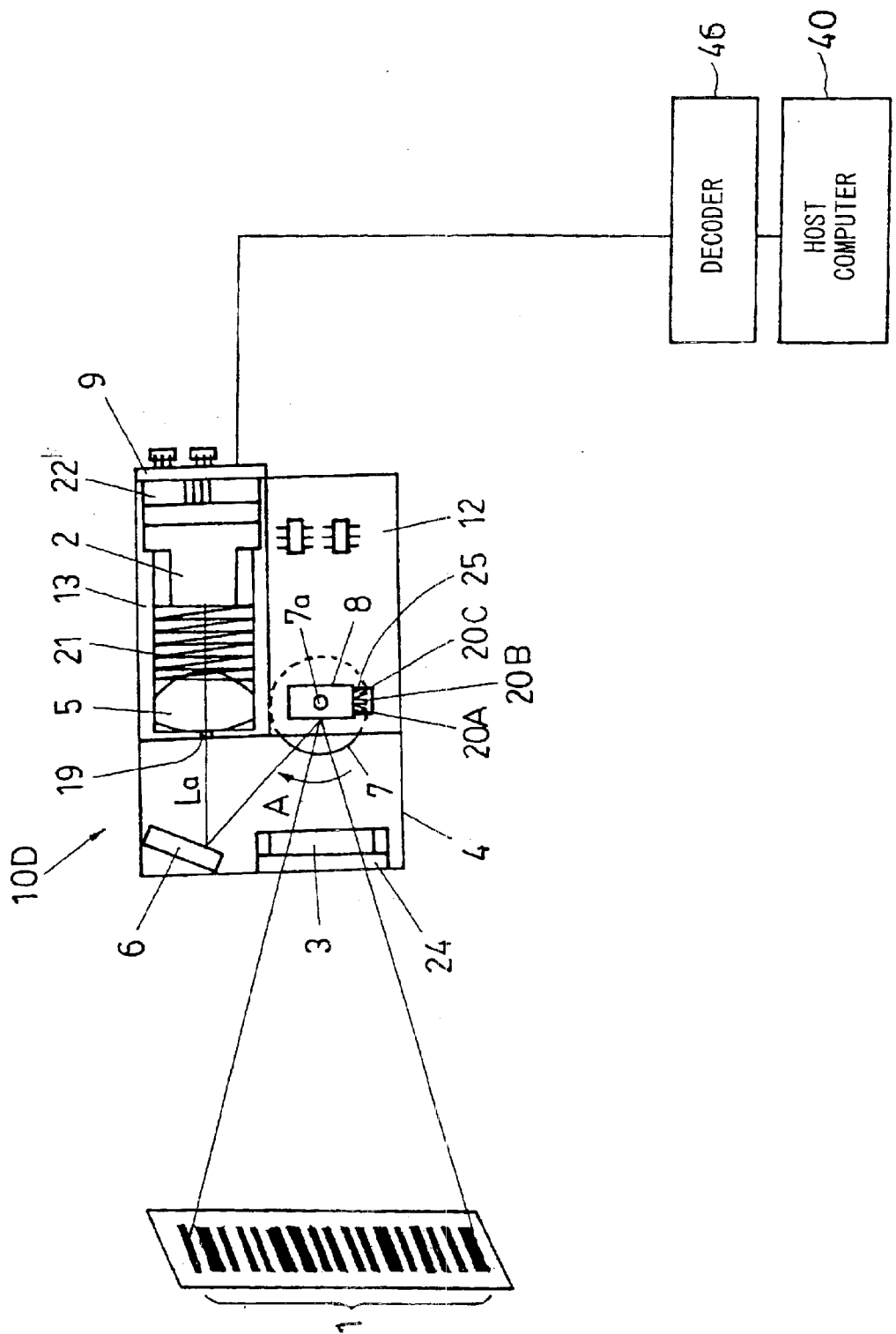
FIG. 36 is a schematic plan view of a fourth embodiment of a bar code reader according to the invention, showing a state of bar code reading.
Figure 37:
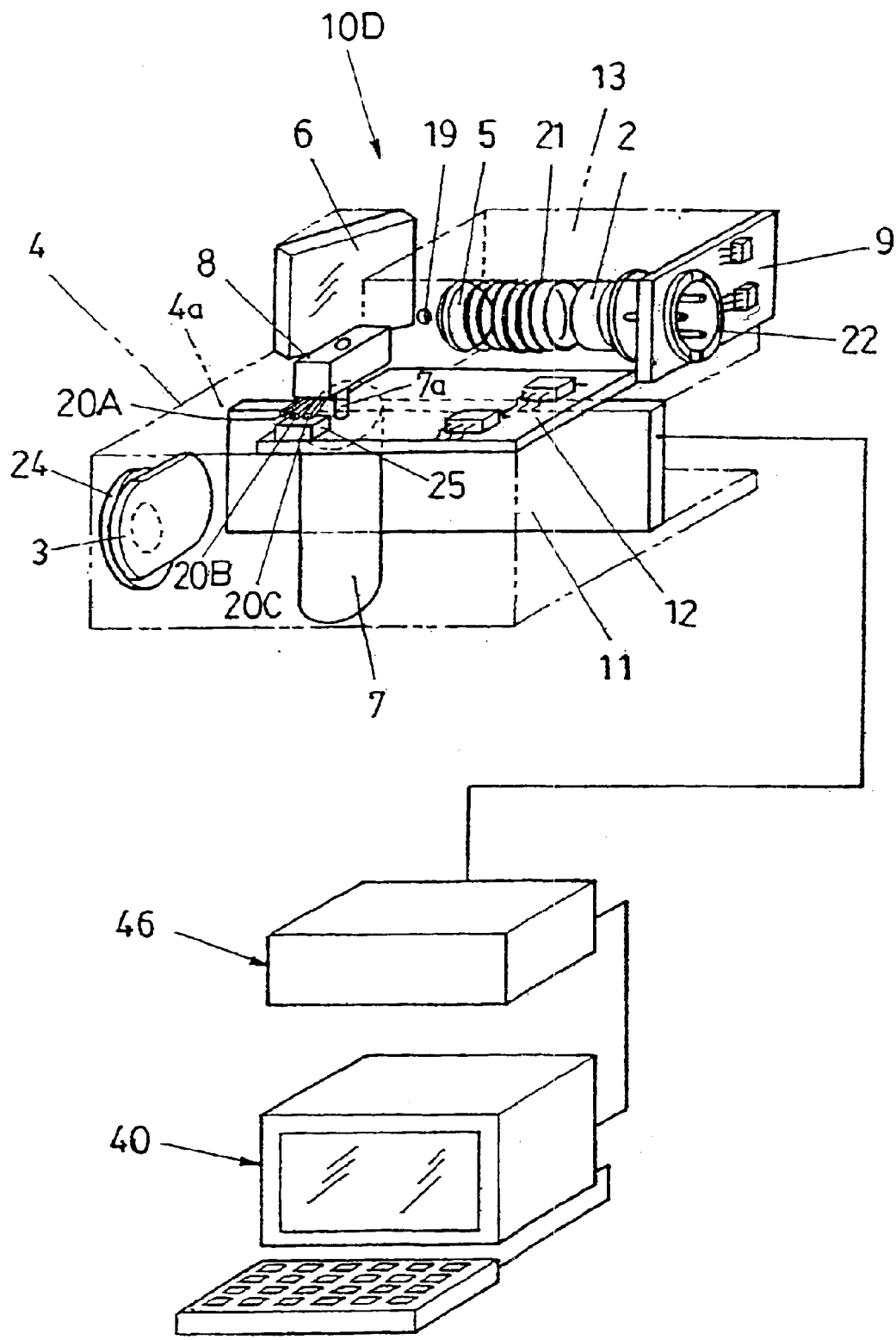
FIG. 37 is a perspective view thereof, showing the constitution of a scanning head thereof in more details.

FIG. 36 is a schematic plan view of the bar code reader, showing a state of bar code reading, and FIG. 37 is a perspective view thereof, showing the constitution thereof in more details. These figures correspond to FIGS. 1 and 2 for the previously-described first embodiment, respectively, and in these figures, parts corresponding to those in FIGS. 1 and 2 are denoted by the like reference numerals, and description thereof is omitted.

A scanning head 10D of the bar code reader differs in construction from the scanning head 10 shown in FIGS. 1 and 2 only in that a first strip 20A, a second strip 20B, and a third strip 20C, serving as first to third sensing indicators, respectively, for detecting a rotation position of a rotatory mirror 8 are installed such that the tip of the respective strips protrudes from the lower edge face of the rotatory mirror 8.

Figure 38:
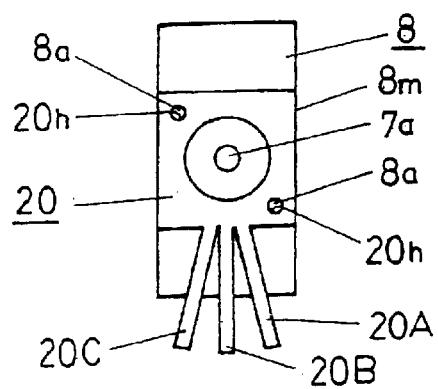
FIG. 38 is a view of a rotatory mirror shown in FIGS. 36 and 37 as seen from the underside thereof.

Herein, rotation position detection means of the rotatory mirror 8 are described. FIG. 38 is a view of a plate for detection 20 as seen from the underside of the rotatory mirror 8, and FIG. 39 is a view showing the configuration of the plate for detection 20 and a reflection type photosensor 25 as seen from the topside of the rotatory mirror 8.

As shown in FIG. 38, a pair of protrusions 8a, 8a for positioning, disposed with a rotatory shaft 7a between them, are provided on the underside face of the rotatory mirror 8 with a reflection face 8m formed thereon, and by fitting the pair of the protrusions 8a, 8a for positioning into a pair of positioning holes 20h, 20h, respectively, the plate for detection 20 is fixedly attached to the rotatory mirror 8 by bonding, caulking or so forth. The plate for detection 20 is provided with the first strip 20A, the second strip 20B, and the third strip 20C as the first to the third sensing indicators, respectively, for detecting a rotation position of the rotatory mirror 8, extending radially from the center of the rotatory shaft 7a at predetermined angular intervals such that the tip of the respective strips protrudes from one of edge faces of the rotatory mirror 8.

Figure 39:
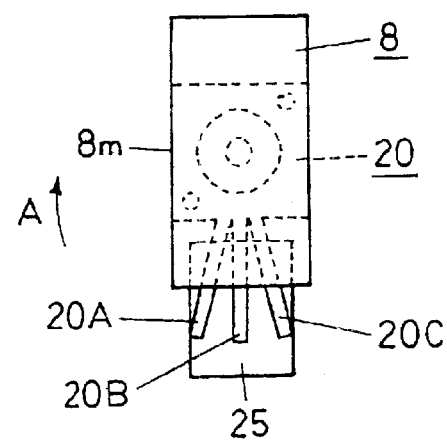
FIG. 39 is a view of the rotatory mirror as seen from the topside thereof, showing the configuration of a plate for detection and a reflection type photosensor.

As shown in FIG. 39, the reflection type photosensor 25 is disposed on a scanning control substrate 12 (refer to FIG. 37) and below a passing position of the first to the third strips 20A, 20B, 20C, so that it is possible by the agency of the reflection type photosensor 25 to sense the strip 20A at one of rotation positions of the rotatory mirror 8 corresponding to the opposite edges of a laser beam scanning range of the bar code 1, the strip 20C at the other of the rotation positions of the rotatory mirror 8 corresponding to the opposite edges of the laser beam scanning range of the bar code 1, and the strip 20B in the center position therebetween The scanning control substrate 12 includes a circuit for detecting the rotation position of the rotatory mirror 8 by sensing passage of the first to third strips 20A, 20B, 20C by the agency of the reflection type photosensor 25, and a circuit for controlling operation of the motor 7 by discriminating a detection signal delivered by the circuit for detecting the rotation position of the rotatory mirror 8.

As shown in FIG. 8, the reflection type photosensor 25 is provided with a light emitting device 25a such as an LED or so forth, integral with a photodetector 25b such as a phototransistor or the like.

The first to third strips 20A, 20B, 20C of the plate for detection 20 and the reflection type photosensor 25 are disposed at respective positions with a spacing interposed therebetween such that sensitivity is at the highest level. Further, with the reflection type photosensor 25, the light emitting device 25a is disposed on the rotatory shaft 7a side (on the inner side) thereof, and the photodetector 25b is disposed on the outer side thereof, thereby ensuring that the light emitting device 25a can shine the strip 20A, 20B or 20C coming directly thereabove with light, and the photodetector 25b can effectively receive reflected light of such light.

Further, consideration should be given such that the difference in reflectance between the underside face of the rotatory mirror 8 and the plate for detection 20 is increased. For example, a black polycarbonate material is used for the underside face of the rotatory mirror 8, and stainless steel is used for the plate for detection 20 so as to indicate reflectance substantially equivalent to that of a white color.

Furthermore, any of the scanning control substrate 12, a laser diode control substrate 9, and an electric signal processing substrate 11 is equipped with a microcomputer for executing overall control of respective units of the scanning head 10D.

Figure 40:
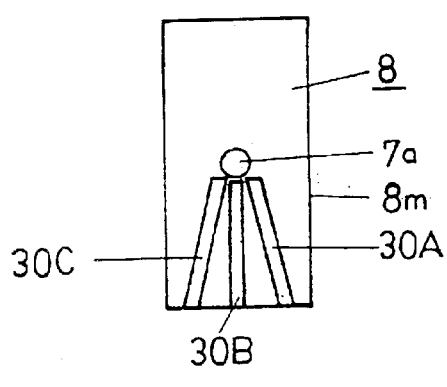
FIG. 40 is a view of another example of a sensing indicator, similar to FIG. 38.
Figure 41:
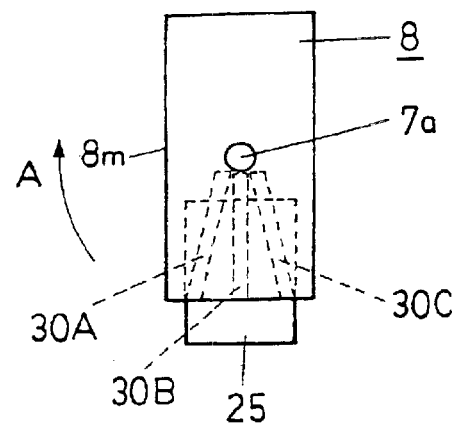
FIG. 41 is a view of the sensing indicator, similar to FIG. 39.

FIGS. 40 and 41 are views showing another example of the sensing indicators for detecting a rotation position of a rotatory mirror 8, FIG. 40 is a view thereof as seen from the underside of the rotatory mirror 8, and FIG. 41 is a view showing the configuration of the sensing indicators and a reflection type photosensor as seen from the topside of the rotatory mirror 8.

As shown in FIG. 40, in the case of this example, a first coated stripe 30A, a second coated stripe 30B, and a third coated stripe 30C, as first to third sensing indicators, respectively, for detecting a rotation position of the rotatory mirror 8, are formed on the underside face of the rotatory mirror 8 with a reflection face 8m formed thereon, in such a way as to extend radially at predetermined angular intervals from the center of the rotatory shaft 7a towards one of edge faces of the rotatory mirror 8 by printing with ink or by applying paint.

The first to third coated stripes 30A, 30B, 30C are formed by spray painting the underside face of the rotatory mirror 8 made of, for example, a black polycarbonate material, with white paint such that the difference in reflectance between the underside face of the rotatory mirror 8 and the first to third coated stripes 30A, 30B, 30C is increased.

Further, as shown in FIG. 41, the reflection type photosensor 25 is disposed below passing positions of the first to third coated stripes 30A, 30B, 30C, and on the scanning control substrate 12 (refer to FIG. 37).

Since the constitution and operation of this example, in other respects, are the same as those for the case of the example previously described with reference to FIGS. 38 and 39, description thereof is omitted.

Figure 42:
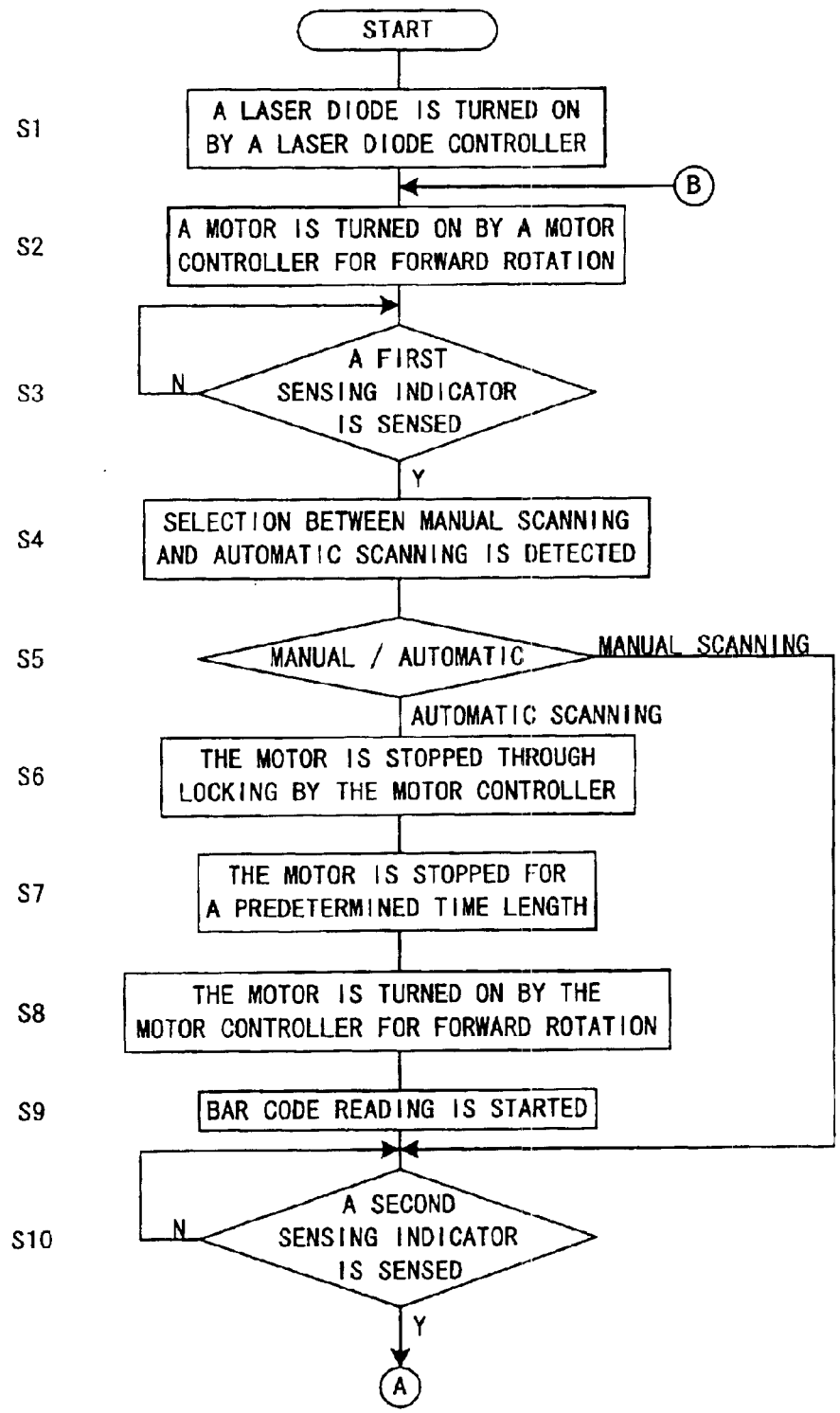
FIGS. 42 and 43 are flow charts showing a control process flow of the scanning head of the bar code reader shown in FIGS. 36 and 37.
Figure 43:
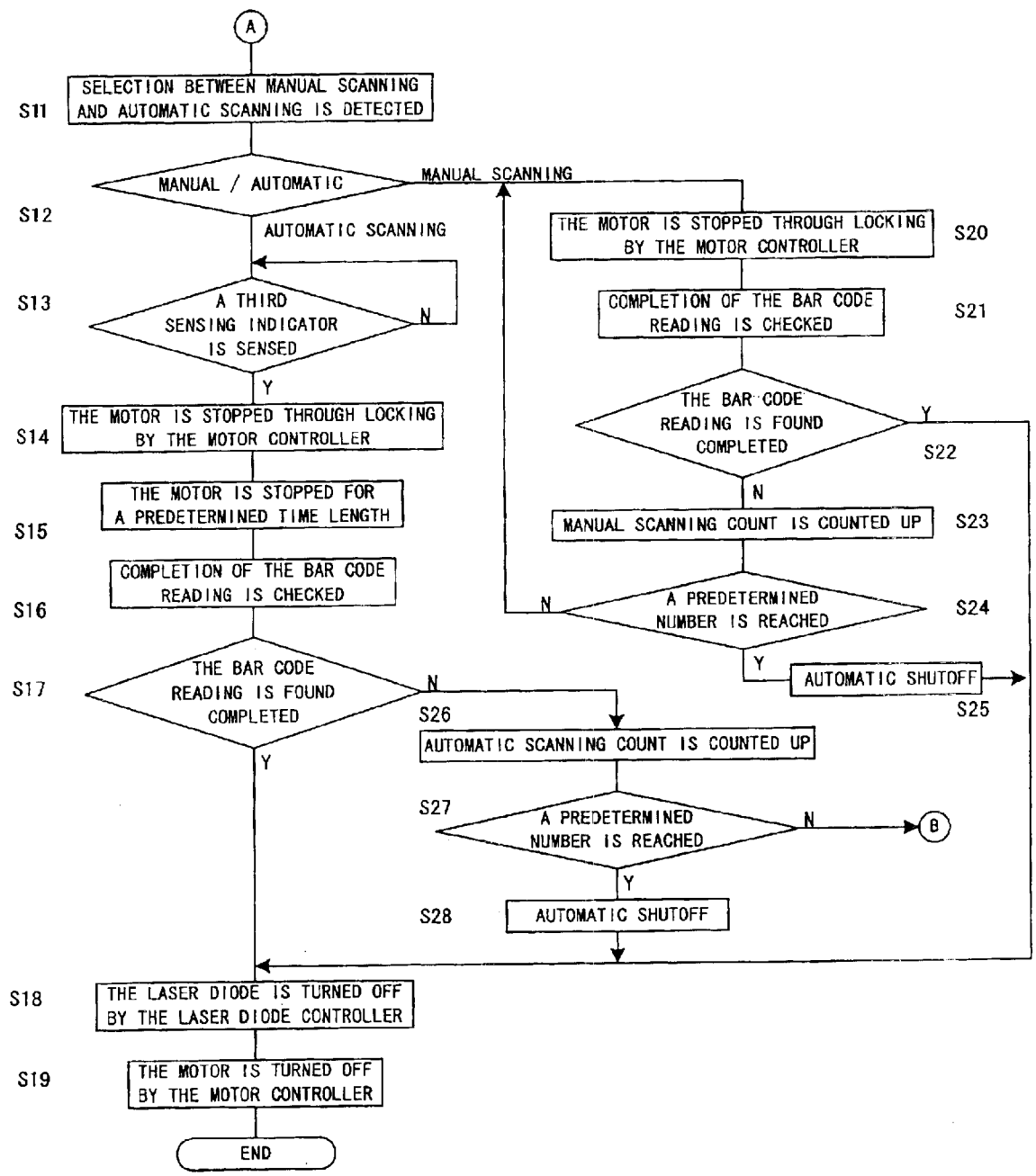

Next, a control process of the scanning head 10D of the bar code reader according to the fourth embodiment will be described hereinafter by referring to flow charts shown in FIGS. 42 and 43. FIGS. 42 and 43 show one continuous flow chart, however, for convenience in illustration, it is divided into two flow charts in two figures. Control shown in these flow charts is executed by a command from the microcomputer for executing overall control of the respective units of the scanning head 10D, installed on any of substrates 9, 11 and 12.

When the start of bar code reading is instructed with the flick of a switch (not shown) or the like, this process is started.

First, in a step S1 in FIG. 42, a laser diode 2 is turned ON (caused to emit light) by a laser diode controller. Subsequently, in a step S2, a motor 7 is turned ON by a motor controller to be driven for forward rotation (in the direction of the arrow A in FIG. 36).

In a step S3, the process waits for the reflection type photosensor 25 to sense the first sensing indicator (the first strip 20A or the first coated stripe 30A), and upon sensing the same, selection between manual scanning and automatic scanning is detected in a step S4. A method of selection is the same as that for the first embodiment described in the foregoing. Subsequently, in a step S5, discrimination is made on whether a detection result indicates the manual scanning or the automatic scanning.

In the case of the manual scanning, the process proceeds directly to a step S10, wherein the process waits for the reflection type photosensor 25 to sense the second sensing indicator (the second strip 20B or the second coated stripe 30B).

In the case of the automatic scanning, the process proceeds to a step S6, wherein the motor 7 is stopped through locking by the motor controller. Herein, "stopped through locking" means the same operation as that in the step 4 in FIG. 13 for the first embodiment.

Thereafter, in a step S7, the motor 7 is stopped for a predetermined time length as optionally preset, and in a step S8, the motor 7 is turned ON, thereby driving the rotatory mirror 8 for forward rotation.

Subsequently, in a step S9, bar code reading is started, and in a step S10, the process waits for the reflection type photosensor 25 to sense the second sensing indicator (the second strip 20B or the second coated stripe 30B). Upon sensing the same, the process proceeds to a step S11 in FIG. 43, wherein selection between the manual scanning and the automatic scanning is detected again. Subsequently, in a step S12, discrimination is made on whether a detection result indicates the manual scanning or the automatic scanning.

If the detection result indicates the automatic scanning, the process proceeds to a step S13, wherein the bar code reading is continued until the third sensing indicator (the third strip 20C or the third coated stripe 30C) is sensed, and upon sensing the same, the motor 7 is stopped through locking by the motor controller in a step S14. Thereafter, in a step S15, the motor 7 is stopped for only a predetermined time length as optionally preset, and in a step S16, completion of the bar code reading is checked.

Subsequently, in a step S17, decision is made on whether or not the bar code reading is completed, and if found completed, the process proceeds to a step S18, wherein the laser diode 2 is turned OFF by the laser diode controller. Subsequently, in a step S19, the motor 7 is turned OFF by the motor controller, thereby completing the process.

If decision is made in the step S17 that the bar code reading is not completed, the process proceeds to a step S26, wherein automatic scanning count is counted up, and in a step S27, decision is made on whether or not a predetermined number of the automatic scanning count has been reached. If it is decided that the predetermined number has not been reached as yet, the process reverts to the step S2 in FIG. 42, wherein the motor 7 is turned ON, and thereby the rotatory mirror 8 is driven for forward rotation, repeating the previously-described steps of processing.

If it is decided in the step S27 that the predetermined number has been reached, an automatic shutoff function is activated in a step S28, whereupon the process proceeds from the step S18 to the step S19, and thereby the laser diode 2 and the motor 7 are turned OFF, thus completing the process.

Meanwhile, in the case where it is decided in the step S12 that the detection result indicates the manual scanning, the process proceeds to a step S20, wherein the motor 7 is stopped through locking by the motor controller, and the rotatory mirror 8 is stopped, thereby stopping scanning by the laser beam at the central position of an automatic scanning range. Thereafter, by manually shifting the scanning head 10D, the bar code 1 is scanned, and the process waits for completion of the bar code reading.

In a step S21, the completion of the bar code reading is checked, and in a step S22, decision is made on whether or not the bar code reading has been completed.

If it is decided as a result that the bar code reading has been completed, the process proceeds from the step S18 to the step S19, and thereby the laser diode 2 and the motor 7 are turned OFF, thus completing the process.

If it is decided that the bar code reading has not been completed, manual scanning count is counted up in a step S23, and in a step S24, decision is made on whether or not a predetermined number of the manual scanning count has been reached.

If it is decided that the predetermined number has not been reached as yet, the process reverts to the step S20, continuing stoppage of the motor 7 and the rotatory mirror 8, and repeats the previously-described steps up to the step S24, waiting for completion of the bar code reading by the manual reading.

However, if it is decided in the step S24 that the predetermined number has been reached, the process proceeds to a step S25, wherein the automatic shutoff function is activated, thereafter proceeding from the step S18 to the step S19, wherein the laser diode 2 and the motor 7 are turned OFF, thus completing the process.

With this embodiment of the invention, either the automatic scanning or the manual scanning can be optionally selected, and in the case of the automatic scanning, rotation of the motor 7 for rotating the rotatory mirror 8 is controlled such that scanning by the laser beam is stopped for the predetermined time length upon sensing the first sensing indicator before the start of the bar code reading, and scanning by the laser beam is also stopped for the predetermined time length upon sensing the third sensing indicator after the bar code reading. Accordingly, it is possible to easily recognize the laser beam when the scanning is stopped at the opposite ends of the bar code, and to check a scanning position and a width of the laser beam on the bar code surface, thereby enabling the manual adjustment to optimize the scanning position with ease.

Further, in the case of the manual scanning, since the motor 7 is stopped through locking upon sensing the second sensing indicator positioned at the center of the scanning range of the bar code following rotation of the rotatory mirror 8, scanning by the laser beam is also stopped, and thereby the bar code can be manually scanned and read with reliability while visually recognizing the laser beam.

As for means of selection between the automatic scanning and the manual scanning, no particular description is given, however, a switch for auto/manual changeover may be installed at a suitable position on a case for housing the scanning head 10D, or such selection may be executed by combination manipulation of a plurality of switches as with the first embodiment shown in FIGS. 21 and 22.

Further, although not executed in the flow charts shown in FIGS. 42 and 43, the process may include a step of controlling a laser beam scanning speed such that, during a period of the bar code reading from a time of the reflection type photosensor 25 sensing the first sensing indicator (the first strip 20A or the first coated stripe 30A) up to a time of the reflection type photosensor 25 sensing the third sensing indicator (the third strip 20C or the third coated stripe 30C), the laser beam scanning speed controlled by the rotatory mirror 8 is reduced by slowing down a revolution speed of the motor 7 while the laser beam scanning speed is increased at other times (during a period when the bar code 1 is not being scanned by the laser beam).

By so doing, it becomes easier to check the scanning position and the width of the laser beam, and to correct the scanning position during a period when the bar code 1 is being scanned by the laser beam, thereby enabling the bar code reading to be executed with reliability.

Now, other examples of the sensing indicators will be described hereinafter. The sensing indicators of the rotatory mirror 8 are preferably installed radially in relation to the rotation center of the rotatory mirror 8 in order to enable the reflection type photosensor 25 to sense the rotation position of the rotatory mirror 8 as the rotatory optical deflector at three spots, corresponding to positions of the opposite edges of the laser beam scanning range of the bar code, and a position at the center therebetween, respectively. However, this is not one of essential requirements.

Figure 44:
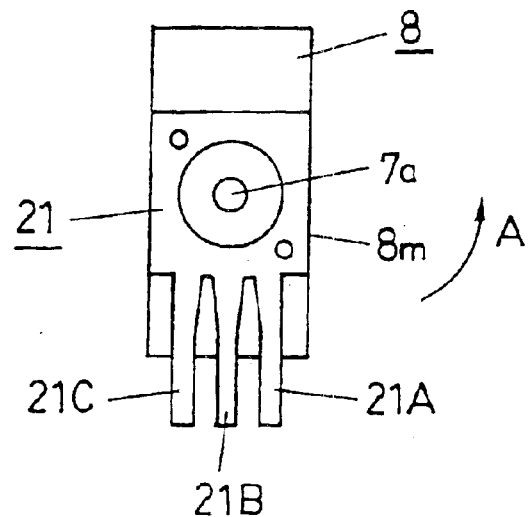
FIGS. 44 and 45 are views of a rotatory mirror as seen from the underside thereof, showing other different examples of sensing indicator, respectively.

For example, as shown in FIG. 44, a plate for detection 21 attached to the underside face of the rotatory mirror 8 may be provided with the first, second, and third strips 21A, 21B, 21C as the sensing indicators, disposed so as to be in parallel with the reflection face 8m of the rotatory mirror 8 and to be protruded out of one of edge faces thereof, at predetermined intervals in the direction of rotation of the rotatory mirror 8 (in the direction of the arrow A).

Similarly, in the case of the first, second, and third coated stripes 30A, 30B, 30C shown in FIGS. 40 and 41, the respective coated stripes 30A, 30B, 30C may be formed in such a way as to be in parallel with the reflection face 8m at predetermined intervals in the direction of rotation of the rotatory mirror 8.

Figure 45:
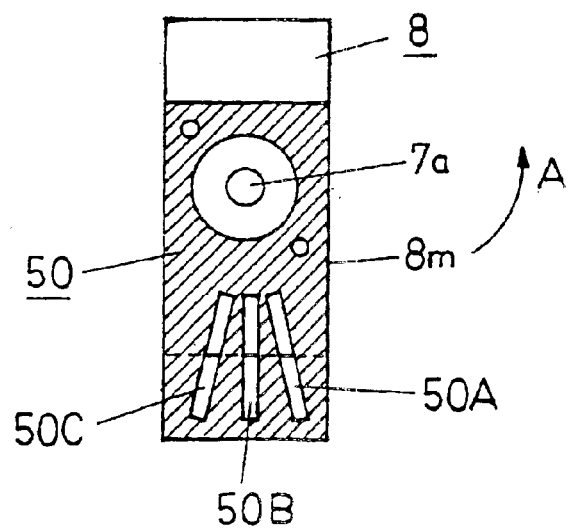

Further, for example, as shown in FIG. 45, a plate for detection 50 attached to the underside face of the rotatory mirror 8 may be provided with first, second and third slits 50A, 50B, 50C as sensing indicators formed radially in relation to the rotation center of the rotatory mirror 8 at predetermined angular intervals. The plate for detection 50 is preferably formed of material having a high reflectance, such as aluminum, or the like, or a face thereof opposite to the reflection type photosensor 25 is preferably painted in a color having a high reflectance, such as a white color or the like. Also, the plate for detection 50 may be provided with three slits 50A, 50B, 50C formed in such a way as to be in parallel with the reflection face of the rotatory mirror 8.

In this case, a time when the reflected light is no longer sensed after sensing a side edge of the plate for detection 50 by rotation of the rotatory mirror 8 indicates sensing of the first slit 50A, subsequently, a time when the reflected light comes to be no longer sensed again after sensing the reflected light indicates sensing of the second slit 50B, and a time when the reflected light comes to be no longer sensed once more after sensing the reflected light indicates sensing of the third slit 50C. Processing of such signals can be executed by the microcomputer through a software program.

Further, the rotatory mirror 8 which is the rotatory optical deflector for scanning is not limited to one rotatable in a given direction only, but may be one which can rotatively reciprocate within a predetermined angle range. It follows in such a case that the function of the first sensing indicator is interchanged with that of the second sensing indicator as the rotation of the rotatory mirror 8 is alternated from the forward direction to the backward direction and vice versa.

Needless to say, it is possible to house the scanning head 10D according to the fourth embodiment as well in a pen-type case, and to transmit binarized data obtained by scanning the bar code to a computer through infrared communication as shown in FIGS. 20 to 22.

Fifth Embodiment: FIGS. 46 to 54

Next, a fifth embodiment of a bar code reader according to the invention is described with reference to FIGS. 46 to 54.

Figure 46:
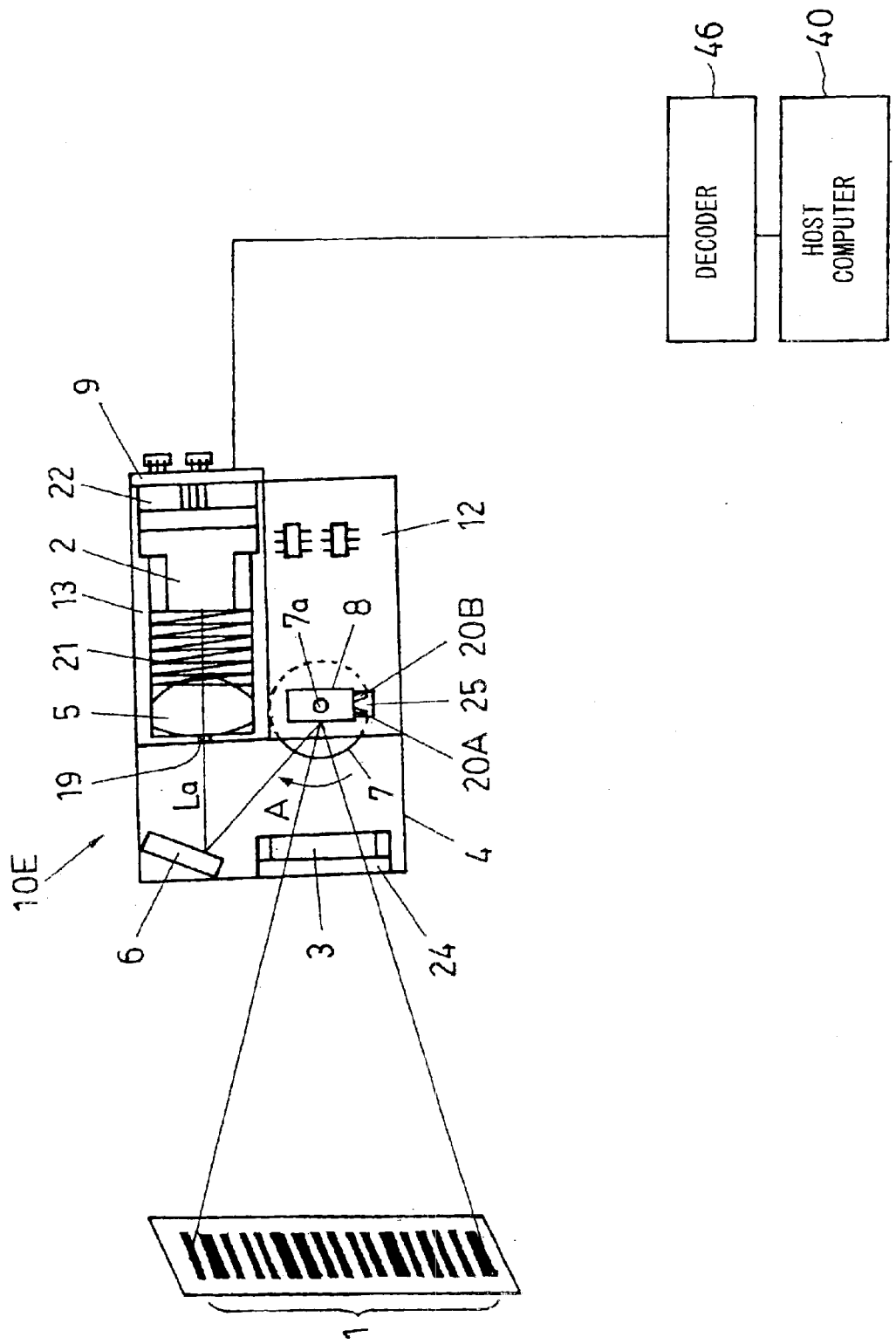
FIG. 46 is a schematic plan view of a fifth embodiment of a bar code reader according to the invention, showing a state of bar code reading.
Figure 47:
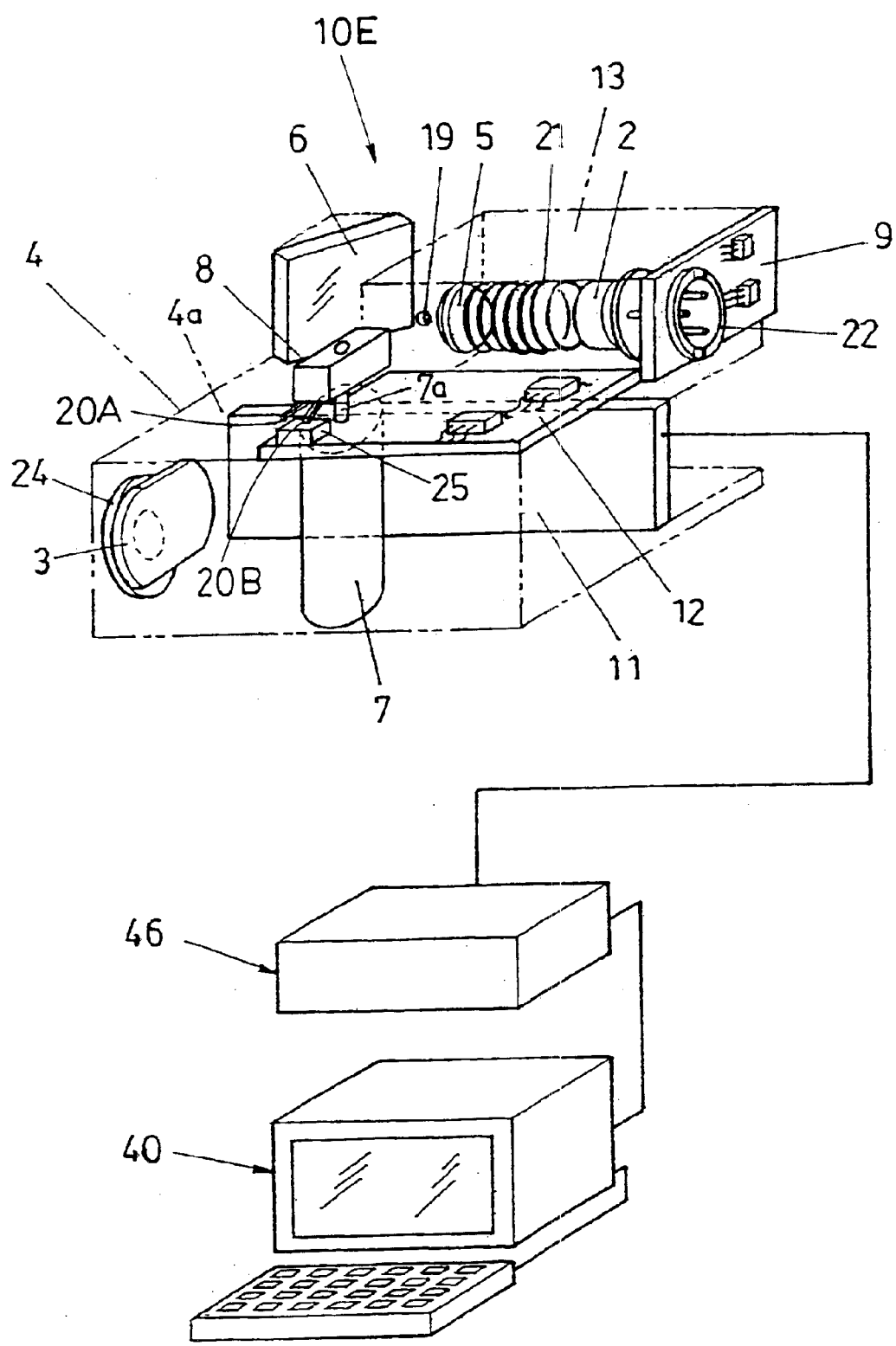
FIG. 47 is a perspective view thereof, showing the constitution of a scanning head thereof in more details.

FIG. 46 is a schematic plan view of the fifth embodiment of the bar code reader according to the invention showing a state of bar code reading, and FIG. 47 is a perspective view thereof showing the constitution thereof in more details.

These figures correspond to FIGS. 1 and 2 for the previously-described first embodiment, respectively, and in these figures, parts corresponding to those in FIGS. 1 and 2 are denoted by the like reference numerals, and description thereof is omitted.

A scanning head 10E of the bar code reader differs in construction from the scanning head 10 shown in FIGS. 1 and 2 only in that a first strip 20A and a second strip 20B as sensing indicators for detecting a rotation position of a rotatory mirror 8 are installed so as to extend radially from the center of the rotatory shaft 7a such that the tip of the respective strips protrude from the lower edge face of the rotatory mirror 8.

Figure 48:
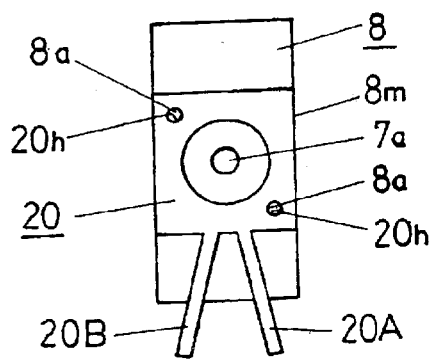
FIG. 48 is a view of a rotatory mirror shown in FIGS. 46 and 47, as seen from the underside thereof.

Herein, rotation position detection means of the rotatory mirror 8 are described. FIG. 48 is a view of a plate for detection 20 as seen from the underside of the rotatory mirror 8, and FIG. 49 is a view showing the configuration of the plate for detection 20 and a reflection type photosensor 25 as seen from the topside of the rotatory mirror 8.

As shown in FIG. 48, a pair of protrusions 8a, 8a for positioning, disposed with a rotatory shaft 7a between them, are provided on the underside face of the rotatory mirror 8 with a reflection face 8m formed thereon, and by fitting the pair of the protrusions 8a, 8a for positioning into a pair of positioning holes 20h, 20h, respectively, the plate for detection 20 is fixedly attached to the rotatory mirror 8 by bonding, caulking, or so forth. The plate for detection 20 is provided with a pair of strips, namely, a first strip 20A and a second strip 20B as sensing indicators for detecting a rotation position of the rotatory mirror 8, extending radially from the center of the rotatory shaft 7a at a predetermined angular interval such that the tip of the respective strips protrude from one of edge faces of the rotatory mirror 8.

Figure 49:
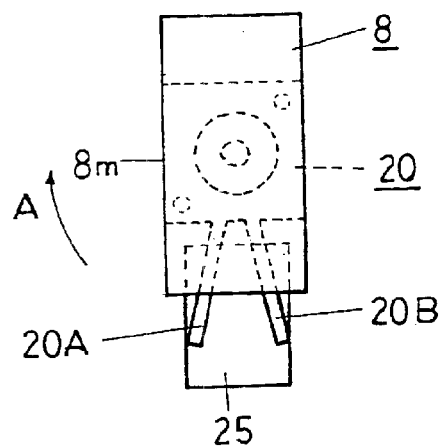
FIG. 49 is a view of the rotatory mirror described above as seen from the topside thereof, showing the configuration of a plate for detection and a reflection type photosensor.

As shown in FIG. 49, the reflection type photosensor 25 is disposed on a scanning control substrate 12 (refer to FIG. 47) and below passing positions of the first strip 20A and the second strip 20B so that the first strip 20A at one of the rotation positions of the rotatory mirror 8, corresponding to the opposite edges of a laser beam scanning range of the bar code 1, and the second strip 20B at the other of the rotation positions of the rotatory mirror 8, corresponding to the opposite edges of a laser beam scanning range of the bar code 1, can be sensed respectively by the reflection type photosensor 25.

The scanning control substrate 12 includes a circuit for detecting the rotation position of the rotatory mirror 8 by sensing passage of the first strip 20A and the second strip 20B, respectively, by the agency of the reflection type photosensor 25, and a circuit for controlling operation of the motor 7 by discriminating a detection signal delivered by the circuit for detecting the rotation position of the rotatory mirror 8.

The reflection type photosensor 25 is provided with a light emitting device 25a such as an LED or so forth, integral with a photodetector 25b such as a phototransistor or the like, as shown in FIG. 8. The constitution of this embodiment, in other respects, is the same as that for the first embodiment.

Figure 50:
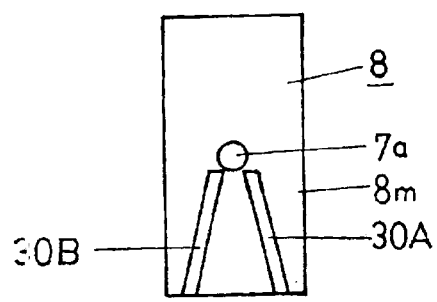
FIG. 50 is a view showing another example of a sensing indicator, similar to FIG. 48.
Figure 51:
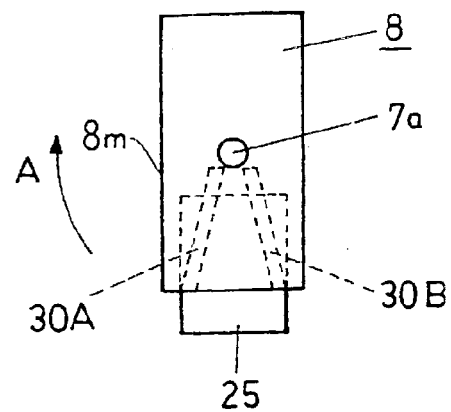
FIG. 51 is a view of the sensing indicator described above, similar to FIG. 49.

FIGS. 50 and 51 are views showing other examples of the sensing indicators for detecting the rotation position of the rotatory mirror 8, for use in carrying out this embodiment, FIG. 50 is a view thereof as seen from the underside of the rotatory mirror 8, and FIG. 51 is a view showing the configuration of the sensing indicators and the reflection type photosensor as seen from the topside of the rotatory mirror 8.

As shown in FIG. 50, in this example, a pair of coated stripes, namely, a first coated stripe 30A and a second coated stripe 30B, as sensing indicators for detecting a rotation position of the rotatory mirror 8, are formed on the underside face of the rotatory mirror 8 with a reflection face 8m formed thereon, in such a way as to extend radially at a predetermined angular interval from the center of the rotatory shaft 7a towards one of edge faces of the rotatory mirror 8 by printing with ink or by applying paint.

The first coated stripe 30A and the second coated stripe 30B are formed by spray painting the underside face of the rotatory mirror 8 made of, for example, a black polycarbonate material with white paint such that the difference in reflectance between the underside face of the rotatory mirror 8 and the first and second coated stripes 30A, 30B is increased.

Further, as shown in FIG. 51, the reflection type photosensor 25 is disposed below passing positions of the first coated stripe 30A and the second coated stripe 30B, and on the scanning control substrate 12 (refer to FIG. 47).

Since the constitution and operation of this example, in other respects, are the same as those for the case of the example previously described with reference to FIGS. 9 to 12, description thereof is omitted.

Next, a control process of the scanning head 10E of the bar code reader will be described hereinafter by referring to a flow chart shown in FIG. 52. Control shown in the flow chart is executed by a command from a microcomputer for executing overall control of the respective units of the scanning head 10E, installed on any of the substrates 9, 11 and 12.

When the start of bar code reading is instructed with the flick of a switch, or the like, this process is started.

Figure 52:
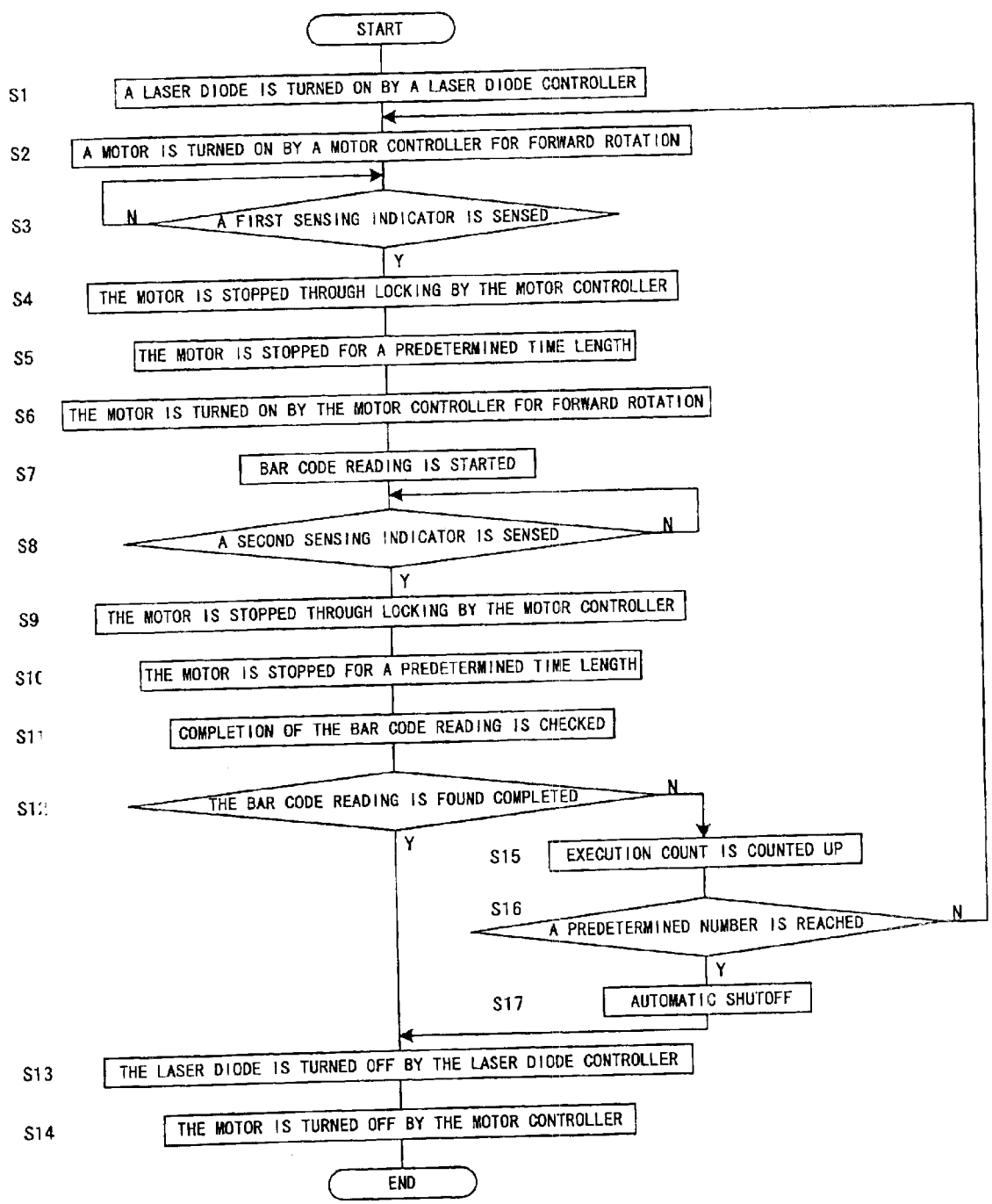
FIG. 52 is a flow chart showing a control process flow of the scanning head of the bar code reader shown in FIGS. 46 and 47.

First, in a step S1 in FIG. 52, a laser diode 2 is turned ON (caused to emit light) by a laser diode controller. Subsequently, in a step S2, a motor 7 is turned ON by a motor controller to be driven for forward rotation.

In a step S3, the process waits for the reflection type photosensor 25 to sense the first sensing indicator (the first strip 20A or the first coated stripe 30A), and upon sensing the same, the motor 7 is stopped through locking by the motor controller in a step S4. Herein, "stopped through locking" means the same operation as that in the step 4 in FIG. 13 for the first embodiment.

Thereafter, in a step S5, the motor 7 is stopped for only a predetermined time length as optionally preset, and in a step S6, the motor 7 is again turned ON to be driven for forward rotation.

Subsequently, in a step S7, bar code reading is started, and in a step S8, the bar code reading is continued until the second sensing indicator (the second strip 20B or the second coated stripe 30B) is sensed by the reflection type photosensor 25, and upon sensing the same, the motor 7 is stopped through locking by the motor controller in a step S9.

Thereafter, in a step S10, the motor 7 is stopped for a predetermined time length as optionally preset, and in a step S11, completion of the bar code reading is checked. Subsequently, in a step S12, decision is made on whether or not the bar code reading is completed, and if found completed, the process proceeds to a step S13, wherein the laser diode 2 is turned OFF (puts out light) by the laser diode controller. Subsequently, in a step S14, the motor 7 is turned OFF by the motor controller, thereby completing the process.

If decision is made in the step S12 that the bar code reading is not completed, the process proceeds to a step S15, wherein scanning count is counted up, and reverts to the step S2 before it is decided in a step S16 that a predetermined number of the scanning count is reached, waiting for the reflection type photosensor 25 to sense the first sensing indicator (the first strip 20A or the first coated stripe 30A) again by turning ON the motor 7 to be driven for forward rotation and causing the rotatory mirror 8 to make approximately one turn. Thereafter a series of the steps described as above are repeated.

However, if the bar code reading is not completed even after the series of the steps described are executed the predetermined number of times, the predetermined number of the scanning count will be reached in the step S16, whereupon an automatic shutoff function is executed in a step S17, and the process proceeds to the previously-described steps S13 and S14, wherein the laser diode 2 and the motor 7 are turned OFF, respectively, thereby completing the process.

With the fifth embodiment of the invention, rotation of the motor 7 is controlled such that scanning by the laser beam is stopped for the predetermined time length upon sensing the first sensing indicator before the start of the bar code reading, and scanning by the laser beam is also stopped for the predetermined time length upon sensing the second sensing indicator after the bar code reading. Accordingly, it is possible to easily recognize the laser beam when the scanning is stopped at the opposite ends of the bar code, and to check the scanning position and the width of the laser beam on the bar code surface, thereby enabling the manual adjustment to optimize the scanning position with ease.

Further, although not executed in the flow chart shown in FIG. 52, the process may include a step of controlling a laser beam scanning speed such that, during a period of the bar code reading from a time of the reflection type photosensor 25 sensing the first sensing indicator (the first strip 20A or the first coated stripe 30A) up to a time of the reflection type photosensor 25 sensing the second sensing indicator (the second strip 20B or the second coated stripe 30B), the laser beam scanning speed controlled by the rotary mirror 8 is reduced by slowing down a revolution speed of the motor 7 while the laser beam scanning speed is increased at other times (during a period when the bar code 1 is not being scanned by the laser beam).

By so doing, it becomes easier to check the scanning position and the width of the laser beam, and to correct the scanning position during a period when the bar code 1 is being scanned by the laser beam, thereby enabling the bar code reading to be executed with reliability.

Now, other examples of the sensing indicators for use in carrying out this embodiment will be described hereinafter. The sensing indicators of the rotary mirror 8 are preferably installed radially in relation to the rotation center of the rotary mirror 8 in order to enable the reflection type photosensor 25 to sense the rotation position of the rotary mirror 8 as the rotary optical deflector at two spots, corresponding to the positions of the opposite edges of the laser beam scanning range of the bar code, respectively. However, this is not one of essential requirements.

Figure 53:
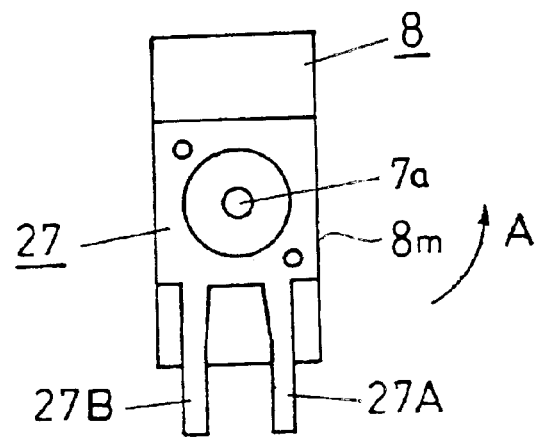
FIGS. 53 and 54 are views of a rotatory mirror as seen from the underside thereof, showing other different examples of sensing indicator, respectively.

For example, as shown in FIG. 53, a plate for detection 27 attached to the underside face of the rotary mirror 8 may be provided with a pair of strips 27A, 27B as the sensing indicators, disposed so as to be in parallel with the reflection face 8m of the rotary mirror 8 and to be protruded out of one of edge faces thereof, at a predetermined interval provided therebetween in the direction of rotation of the rotary mirror 8 (in the direction of the arrow A).

Similarly, in the case of the pair of the coated stripes 30A, 30B shown in FIGS. 50 and 51, the pair of the coated stripes 30A, 30B may be formed in such a way as to be in parallel with the reflection face 8m at a predetermined interval provided therebetween in the direction of rotation of the rotary mirror 8.

Figure 54:
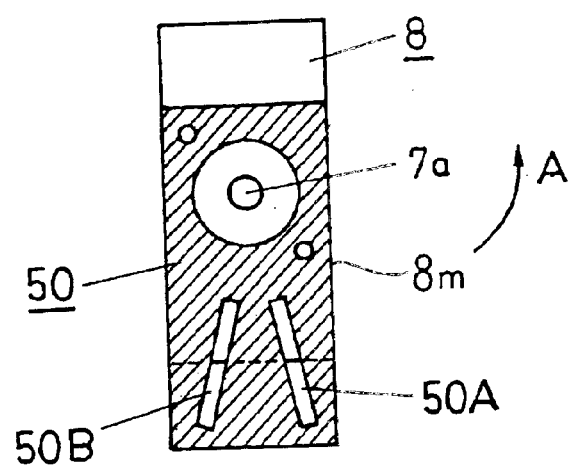

Further, for example, as shown in FIG. 54, a plate for detection 50 attached to the underside face of the rotary mirror 8 may be provided with a pair of slits 50A, 50B as sensing indicators, formed radially in relation to the rotation center of the rotary mirror 8 at a predetermined angular interval. The plate for detection 50 is preferably formed of material having a high reflectance, such as aluminum or the like, or a face thereof opposite to the reflection type photosensor 25 is preferably painted in a color having a high reflectance, such as a white color or the like. Also, the plate for detection 50 may be provided with a pair of slits 50A, 50B, formed in such a way as to be in parallel with the reflection face 8m of the rotary mirror 8.

In this case, a time when reflected light is no longer sensed after sensing a side edge of the plate for detection 50 by rotation of the rotary mirror 8 indicates sensing of the first slit 50A, and subsequently, a time when the reflected light comes to be no longer sensed once more after sensing the reflected light indicates sensing of the second slit 50B. Processing of such signals can be executed by the microcomputer through a software program.

Further, the rotary mirror 8 which is the rotary optical deflector for scanning is not limited to one rotatable in a given direction only, but may be one which can rotatively reciprocate within a predetermined angle range. It follows in such a case that the function of the first sensing indicator is interchanged with that of the second sensing indicator as the rotation of the rotary mirror 8 is alternated from the forward direction to the backward direction and vice versa.

Needless to say, it is possible to house the scanning head 10E according to the fifth embodiment as well in a pen-type case, and to transmit binarized data obtained by scanning the bar code to a computer through infrared communication as shown in FIGS. 20 to 22.

What is claimed is:

1. A bar code reader provided with a laser diode and a rotary optical deflector for deflecting a laser beam emitted by the laser diode for scanning, said bar code reader comprising:

a rotation position detection means for detecting a rotation position of the rotary optical deflector at a position corresponding to a reading start edge of a laser beam scanning range of a bar code;

a means for starting bar code reading by rotating the rotary optical deflector again after stopping rotation of the rotary optical deflector for only a predetermined time length upon the rotation position detection means detecting the rotation position of the rotary optical deflector, and a means for stopping the rotation of the rotary optical deflector for only a predetermined time length upon a laser beam scanning time length reaching a preset scanning time length up to a final position of the bar code reading after the bar code reading is started by the means for starting the bar code reading.

2. A bar code reader according to claim 1, further comprising a means for setting the scanning time length up to the final position of the bar code reading.

3. A bar code reader according to claim 1, further comprising a means for setting the predetermined time length during which rotation of the rotary optical deflector is stopped.

4. A bar code reader according to claim 1, wherein the rotation position detection means is comprised of a sensing indicator provided on the rotary optical deflector, and a reflection photosensor for sensing the sensing indicator, disposed in vicinity of a passage of the sensing indicator.

5. A bar code reader according to claim 4, wherein the sensing indicator is a strip provided such that the strip protrudes from an underside face of the rotary optical deflector.

6. A bar code reader according to claim 4, wherein the sensing indicator is a coated stripe formed on an underside face of the rotary optical deflector by printing or painting with ink or paint, having reflectance differing from that of the underside face.

7. A bar code reader according to claim 4, wherein the sensing indicator is a slit formed on a plate for detection, attached to the rotary optical deflector.

8. A bar code reader provided with a laser diode and a rotary optical deflector for deflecting a laser beam emitted by the laser diode for scanning, said bar code reader comprising:

a rotation position detection means for detecting a rotation position of the rotary optical deflector at a position before a reading start edge of a laser beam scanning range of a bar code;

a means for starting bar code reading by rotating the rotary optical deflector again after stopping rotation of the rotary optical deflector for only a predetermined time length upon a laser beam scanning time length reaching a preset scanning time length up to a reading start position after the rotation position detection means detecting the rotation position or the rotatory optical deflector; and a means for stopping the rotation of the rotary optical deflector for only a predetermined time length upon a laser beam scanning time length reaching a preset scanning time length up to a final position of the bar code reading after the bar code reading is started by the means for starting the bar code reading.

9. A bar code reader according to claim 8, wherein the rotation position detection means is comprised of a sensing indicator provided on the rotary optical deflector, and a reflection photosensor for sensing the sensing indicator, disposed in vicinity of a passage of the sensing indicator.

10. A bar code reader according to claim 9, wherein the sensing indicator is a strip provided such that the strip protrudes from an underside face of the rotary optical deflector.

11. A bar code reader according to claim 9, wherein the sensing indicator is a coated stripe formed on an underside face of the rotary optical deflector by printing or painting with ink or paint, having reflectance differing from that of the underside face.

12. A bar code reader according to claim 9, wherein the sensing indicator is a slit formed on a plate for detection, attached to the rotary optical deflector.

13. A bar code reader provided with a laser diode and a rotary optical deflector for deflecting a laser beam emitted by the laser diode for scanning, said bar code reader comprising:

a means for selecting either automatic scanning or manual scanning;

a rotation position detection means for detecting a rotation position of the rotary optical deflector at a position corresponding to a reading start edge of a laser beam scanning range of a barcode;

a means comprising a function of starting bar code reading by rotating the rotary optical deflector again after stopping rotation of the rotary optical deflector for only a predetermined time length upon the rotation position detection means detecting the rotation position of the rotary optical deflector in a case of the automatic scanning being selected, and a function of subsequently stopping the rotation of the rotary optical deflector for only a predetermined time length upon a laser beam scanning time length reaching a preset scanning time length up to a final position of the bar code reading; and a means for stopping rotation of the rotary optical deflector through locking upon the laser beam scanning time length reaching a preset scanning time length up to a center position of the laser beam scanning range of the bar code after the rotation position detection means detecting the rotation position of the rotary optical deflector in a case of the manual scanning being selected.

14. A bar code reader according to claim 13, wherein the rotation position detection means is comprised of a sensing indicator provided on the rotary optical deflector, and a reflection photosensor for sensing the sensing indicator, disposed in vicinity of a passage of the sensing indicator.

15. A bar code reader according to claim 14, wherein the sensing indicator is a strip provided such that the strip protrudes from an underside face of the rotary optical deflector.

16. A bar code reader according to claim 14, wherein the sensing indicator is a coated stripe formed on an underside face of the rotary optical deflector by printing or painting with ink or paint, having reflectance differing from that of the underside face.

17. A bar code reader according to claim 14, wherein the sensing indicator is a slit formed on a plate for detection, attached to the rotary optical deflector.

18. A bar code reader provided with a laser diode and a rotary optical deflector for deflecting a laser beam emitted by the laser diode for scanning, said bar code reader comprising:

a means for selecting either automatic scanning or manual scanning; a rotation position detection means for detecting a rotation position of the rotary optical deflector at a position corresponding to a reading start edge of a laser beam scanning range of a bar code;

a means comprising a function of stopping rotation of the rotary optical deflector for only a predetermined time length upon a laser beam scanning time length reaching a preset scanning time length up to a reading start position of the bar code reading after the rotation position detection means detecting the rotation position of the rotary optical deflector in a case of the automatic scanning being selected, and a function of subsequently starting bar code reading by rotating the rotary optical deflector again and stopping rotation of the rotary optical deflector for only a predetermined time length upon the laser beam scanning time length reaching a preset scanning time length up to a final reading position of the bar code reading; and a means for stopping rotation of the rotary optical deflector through locking upon the laser beam scanning time length reaching a preset scanning time length up to a center position of the laser beam scanning range of the bar code after the rotation position detection means detecting the rotation position of the rotary optical deflector in a case of the manual scanning being selected.

19. A bar code reader according to claim 18, wherein the rotation position detection means is comprised of a sensing indicator provided on the rotary optical deflector, and a reflection photosensor for sensing the sensing indicator, disposed in vicinity of a passage of the sensing indicator.

20. A bar code reader according to claim 19, wherein the sensing indicator is a strip provided such that the strip protrudes from an underside face of the rotary optical deflector.

21. A bar code reader according to claim 19, wherein the sensing indicator is a coated stripe formed on an underside face of the rotary optical deflector by printing or painting with ink or paint, having reflectance differing from that of the underside face.

22. A bar code reader according to claim 19, wherein the sensing indicator is a slit formed on a plate for detection, attached to the rotary optical deflector.

23. A bar code reader provided with a laser diode and a rotary optical deflector for deflecting a laser beam emitted by the laser diode for scanning, said bar code reader comprising:

a means for selecting either automatic scanning or manual scanning;

a rotation position detection means for detecting a rotation position of the rotatory optical deflector at two spots corresponding to opposite edges of a laser beam scanning range of a bar code, respectively, and at a spot situated between the two spots; and a means comprising a function of stopping rotation of the rotatory optical deflector for only a predetermined tune length upon the rotation position detection means detecting the rotation position of the rotatory optical deflector at the two spots, respectively, in a case of the automatic scanning being selected, and a function of stopping the rotation of the rotatory optical deflector through locking upon the rotation position detection means detecting the rotation position of the rotatory optical deflector at the spot situated between the two spots in a case of the manual scanning being selected.

24. A bar code reader according to claim 23, wherein the rotation position detection means of detecting the rotation position of the rotatory optical deflector at the two spots corresponding to the opposite edges of the laser beam scanning range of the bar code, and at the spot situated between the two spots, respectively, are comprised of three sensing indicators provided at predetermined intervals in a direction of rotation of the rotatory optical deflector, and a reflection photosensor for sensing the three sensing indicators, disposed in vicinity of passages of the three sensing indicators.

25. A bar code reader according to claim 24, wherein the three sensing indicators are provided on the rotatory optical deflector, radially from a center of rotation thereof at a predetermined angular interval, respectively.

26. A bar code reader according to claim 24, wherein the three sensing indicators are strips provided such that the stripes protrude from an underside face of the rotatory optical deflector.

27. A bar code reader according to claim 24, wherein the three sensing indicators are coated stripes formed on an underside face of the rotatory optical deflector by printing or painting with ink or paint, having reflectance differing from that of an underside face.

28. A bar code reader according to claim 24, wherein the three sensing indicators are slits formed on a plate for detection, attached to the rotatory optical deflector.

29. A bar code reader provided with a laser diode and a rotatory optical deflector for deflecting a laser beam emitted by the laser diode for scanning, said bar code reader comprising:

a means for selecting either automatic scanning or manual scanning;

a rotation position detection means for detecting a rotation position of the rotatory optical deflector at two spots corresponding to opposite edges of a laser beam scanning range of a bar code, respectively, and at a spot situated between the two spots; and a means comprising a function of slowing down a rotation speed of the rotatory optical deflector during a period of bar code reading from a time of the rotation position detection means detecting one of the rotation positions at the two spots up to the rotation position detection means detecting the other of the rotation positions while rotating the rotatory optical deflector at a higher speed in other periods, in a case of the automatic scanning being selected, and a function of stopping the rotation of the rotatory optical deflector through locking upon the rotation position detection means detecting the rotation position of the rotatory optical deflector at the spot situated between the two spots in a case of the manual scanning being selected.

30. A bar code radar according to claim 29, wherein the rotation position detection means of detecting the rotation position of the rotatory optical deflector at the two spots corresponding to the opposite edges of the laser beam scanning range of the bar code. and at the spot situated between the two spots, respectively, are comprised of three sensing indicators provided at predetermined intervals in a direction of rotation of the rotatory optical deflector, and a reflection type photosensor for sensing the three sensing indicators, disposed in vicinity of passages of the three sensing indicators.

31. A bar code reader according to claim 30, wherein the three sensing indicators are provided on the rotatory optical deflector, radially from a center of rotation thereof at a predetermined angular interval, respectively.

32. A bar code reader according to claim 30, wherein the three sensing indicators are strips provided such that the stripes protrude from an underside face of the rotatory optical deflector.

33. A bar code reader according to claim 30, wherein the three sensing indicators are coated stripes formed on an underside face of the rotatory optical deflector by printing or painting with ink or paint, having reflectance differing from that of an underside face.

34. A bar code reader according to claim 30, wherein the three sensing indicators are slits formed on a plate for detection, attached to the rotatory optical deflector.

35. A bar code reader provided with a laser diode and a rotatory optical deflector for deflecting a laser beam emitted by the laser diode for scanning, said bar code reader comprising:

a means for detecting rotation position of the rotatory optical deflector at two spots corresponding to opposite edges of a laser beam scanning range of a bar code, respectively; and a means for stopping rotation of the rotatory optical deflector for only a predetermined time length upon the means for detecting rotation position detecting the rotation position of the rotatory optical deflector at the two spots, respectively.

36. A bar code reader according to claim 35, wherein the means for detecting rotation position of the rotatory optical deflector at the two spots corresponding to the opposite edges of the laser beam scanning range of the bar code is comprised of a pair of sensing indicators provided at a predetermined interval in the direction of rotation of the rotatory optical deflector, and a reflection photosensor for sensing the pair of sensing indicators, disposed in vicinity of passages of the pair of the sensing indicators.

37. A bar code reader according to claim 36, wherein the pair of the sensing indicators are provided on the rotatory optical deflector, radially from a center of rotation thereof at a predetermined angular interval.

38. A bar code reader according to claim 36, wherein the pair of the sensing indicators are a pair of strips provided such that the pair of stripes protrude from an underside face of the rotatory optical deflector.

39. A bar code reader according to claim 36, wherein the pair of the sensing indicators are a pair of coated stripes formed on an underside face of the rotatory optical deflector by printing or painting with ink or paint, having reflectance differing from that of the underside face.

40. A bar code reader according to claim 36, wherein the pair of the sensing indicators are a pair of slits formed on a plate for detection, attached to the rotatory optical deflector.

41. A bar code reader provided with a laser diode and a rotatory optical deflector for deflecting a laser beam emitted by the laser diode for scanning, said bar code reader comprising:

a means for detecting rotation position of the rotatory optical deflector at two spots corresponding to opposite edges of a laser beam scanning range of a bar code, respectively; and a means for reducing a rotation speed of the rotatory optical deflector during a time period from a time of the means for detecting rotation position detecting a rotation position of the rotatory optical deflector corresponding to a scanning start edge, up to a time of the means for detecting rotation position detecting a rotation position of the rotatory optical deflector corresponding to a scanning completion edge, from a rotation speed in other periods.

42. A bar code reader according to claim 41, wherein the means for detecting rotation position of the rotatory optical deflector at the two spots corresponding to the opposite edges of the laser beam scanning range of the bar code is comprised of a pair of sensing indicators provided at a predetermined interval in the direction of rotation of the rotatory optical deflector, and a reflection photosensor for sensing the pair of sensing indicators, disposed in vicinity of passages of the pair of the sensing indicators.

43. A bar code reader according to claim 42, wherein the pair of the sensing indicators are provided on the rotatory optical deflector, radially from a center of rotation thereof at a predetermined angular interval.

44. A bar code reader according to claim 42, wherein the pair of the sensing indicators are a pair of strips provided such that the pair of stripes protrude from an underside face of the rotatory optical deflector.

45. A bar code reader according to claim 42, wherein the pair of the sensing indicators are a pair of coated stripes formed on an underside face of the rotatory optical deflector by printing or painting with ink or paint, having reflectance differing from that of the underside face.

46. A bar code reader according to claim 42, wherein the pair of the sensing indicators are a pair of slits formed on a plate for detection, attached to the rotatory optical deflector.

* * * * *